(12) United States Patent
Hunter

(10) Patent No.: US 8,931,602 B2
(45) Date of Patent: Jan. 13, 2015

(54) SUSPENSION SYSTEMS

(76) Inventor: Joseph Richard Andrew Hunter, Eastleigh (GB)

(*) Notice: Subject to any disclaimer, the term of this patent is extended or adjusted under 35 U.S.C. 154(b) by 483 days.

(21) Appl. No.: 12/595,180

(22) PCT Filed: Apr. 9, 2008

(86) PCT No.: PCT/GB2008/001248
§ 371 (c)(1),
(2), (4) Date: Oct. 8, 2009

(87) PCT Pub. No.: WO2008/122804
PCT Pub. Date: Oct. 16, 2008

(65) Prior Publication Data
US 2010/0163357 A1 Jul. 1, 2010

(30) Foreign Application Priority Data
Apr. 10, 2007 (GB) .................. 0706898.4

(51) Int. Cl.
F16F 9/00 (2006.01)
B60G 11/30 (2006.01)
B60G 11/15 (2006.01)
B60G 13/08 (2006.01)
F16F 9/06 (2006.01)
(Continued)

(52) U.S. Cl.
CPC ............. *B60G 11/30* (2013.01); *B60G 11/15* (2013.01); *B60G 13/08* (2013.01); *F16F 9/064* (2013.01); *F16F 9/462* (2013.01); *F16F 9/466* (2013.01); *F16F 9/56* (2013.01); *B60G 2202/12* (2013.01); *B60G 2202/24* (2013.01); *B60G 2500/30* (2013.01)

USPC ... 188/314; 188/281; 188/322.13; 267/64.25; 267/221

(58) Field of Classification Search
CPC ............ F16F 9/062; F16F 9/064; F16F 9/065; F16F 9/067; F16F 9/464; F16F 9/0245; F16F 9/56
USPC .................. 188/319.2, 281, 282.5, 285, 297, 188/322.13, 309, 322.18, 301; 267/217, 267/221, 226, 64.25
See application file for complete search history.

(56) References Cited

U.S. PATENT DOCUMENTS 3,194,262 A * 7/1965 Hamilton et al. ............ 137/493
3,199,636 A * 8/1965 Bourcier De Carbon ..... 188/317
3,256,961 A * 6/1966 Bourcier De Carbon ..... 188/317
(Continued)

FOREIGN PATENT DOCUMENTS

EP 0882907 A 12/1998
EP 1402196 B 12/2004
(Continued)

OTHER PUBLICATIONS

The International Search Report for PCT Application No. PCT/GB2008/001248 dated Nov. 3, 2008.

*Primary Examiner* — Thomas Irvin
(74) *Attorney, Agent, or Firm* — Novak Druce Connolly Bove + Quigg LLP

(57) ABSTRACT

A shock absorber assembly comprises a piston and cylinder arrangement, a damping-fluid chamber and a damping valve arrangement which is located in the damping fluid chamber and serves to divide the chamber into sub-chambers. The assembly is such that in use the valve arrangement regulates the flow of fluid between the sub-chambers.

16 Claims, 23 Drawing Sheets

(51) Int. Cl.
*F16F 9/46* (2006.01)
*F16F 9/56* (2006.01)

(56) References Cited

U.S. PATENT DOCUMENTS

| | | | | |
|---|---|---|---|---|
| 3,312,312 | A | * | 4/1967 | Bourcier De Carbon ..... 188/317 |
| 3,430,648 | A | * | 3/1969 | Botkin ........................... 137/493 |
| 3,605,801 | A | * | 9/1971 | Carbon .......................... 37/513.7 |
| 3,747,714 | A | * | 7/1973 | DeCarbon ..................... 188/317 |
| 3,791,407 | A | * | 2/1974 | Nicholls ................... 137/512.15 |
| 3,845,782 | A | * | 11/1974 | Nicholls et al. ............... 137/493 |
| 4,153,237 | A | * | 5/1979 | Supalla ....................... 267/64.15 |
| 4,241,815 | A | * | 12/1980 | Federspiel ................. 188/282.5 |
| 4,711,435 | A | * | 12/1987 | Harris et al. .................. 267/221 |
| 4,972,929 | A | * | 11/1990 | Ivers et al. ............... 188/322.15 |
| 5,957,252 | A | * | 9/1999 | Berthold ....................... 188/314 |
| 6,286,641 | B1 | | 9/2001 | DeFrenne |
| 2006/0266601 | A1 | | 11/2006 | McAndrews |

FOREIGN PATENT DOCUMENTS

| | | |
|---|---|---|
| GB | 548298 A | 10/1942 |
| WO | 9803361 A | 1/1998 |

* cited by examiner

SUSPENSION SYSTEMS

FIELD OF INVENTION

The present invention relates generally to suspension systems and in particular to shock absorber assemblies for vehicles.

BACKGROUND

For a vehicle without suspension to move over a rough surface, the whole vehicle must rise and fall over every bump. The faster the vehicle moves, the more rapid becomes this up-and-down motion. Bumps hit at high speed can push the vehicle up very hard, but cannot fall back any faster than gravity pulls it. Therefore, even at moderate speeds, the wheel can leave the ground over the top of bumps. A wheel in the air cannot give any grip.

Technology can provide a considerable amount of power, but it is useless unless the tyres are kept in firm contact with the road. Modern vehicle suspensions, acting with the pneumatic tyres, isolate the vehicle, driver and load from these vertical forces. They control the vertical oscillations, caused by traversing uneven terrain or performing rapid manoeuvres such as accelerating, braking or cornering.

Known suspension systems are often a compromise, as they aim to fulfil two opposing functions:
a) Driving comfort, by protecting the driver and loads from vertical oscillations. This is typically achieved by using low spring characteristics such as those found in many luxury motor cars. They commonly have a static to bump spring ratio of about 3:1, tend to be long wheel based and require stiff anti-roll bars to counter the inherent low handling dynamics.
b) Safe vehicle handling dynamics while performing rapid vehicle manoeuvres. This is typically achieved by using a high spring characteristics, as found in most sports/racing vehicles. They commonly have a static to bump spring ratio of about 5:1, but in some cases can be over 9:1. The ratio is limited by the driver's discomfort.

The compromise being: improving driving comfort reduces the dynamic handling; while, improving dynamic handling reduces driving comfort.

This matter is further complicated by the fact that safe handling dynamics can be quantified, but driving comfort cannot. Driving comfort is a personal feeling, each person's tolerance and thresholds are different as they are the result of many factors including involving human senses.

Designing suspension systems for the everyday vehicle is not usually an arduous task, as the levels of comfort to dynamic handling tend to be within reasonable limits and not at extremes. Problems arise when those levels do reach extremes, eg for off-road or sports/racing vehicles, and is where the handling dynamics become limited by the individual driver's discomfort (fatigue).

Suspension systems are generally formulated by applying proven mathematical models and using known technologies to produce a solution with defined compromises. This is achieved as the spring and damping characteristics are a direct resultant of:
i. The range of mass being supported by each wheel, ie from unladen to fully laden (vehicle dependant).
ii. The appropriate vertical wheel travel (terrain dependant).
iii. The speed traversing over the terrain (driver comfort dependant).
iv. The vehicle classification, eg luxury, road, sport or race (driver comfort/vehicle handling dynamics dependant).

Compensating for this need to compromise has led to the necessity to incorporate auxiliary suspension stabilizers, such as anti-roll bars (or 'sway bars') which restrict axle articulation. The relentless quest to provide reasonable driving comfort along with good dynamic handling has also led to the generation of a wide variety of suspension geometries aimed at limiting the vertical body movement while reducing pitch and roll.

Most known suspension systems are essentially non-adjustable. Some bespoke suspension systems for racing vehicles allow some form of limited adjustment. Such adjustments are currently limited to:
a) Ride height via mechanical mechanisms (for example by way of a threaded spring stop on over-coil shock absorber).
b) Low flow rate bump damping by way of needle valves to independently adjust the low flow rate damping force generated during bump (wheel rising, also known as 'Jounce' in USA).
c) Low flow rate rebound damping, also by way of needle valves to independently adjust the low flow rate-damping force generated during rebound (wheel lowering).
d) High flow rate bump damping is only available to the professional racer.
e) High flow rate rebound damping is usually only available to the professional racer.

Although these bump and rebound adjustments a) and b) principally affect the low flow rate damping forces, they also change the high flow rate characteristics by very small amounts.

The slope and shape of the high flow rate characteristics are defined by, and changed by, damping washers or 'shims'. These however can only be changed by a specialist (eg the manufacturer or its authorised dealers) and is not an adjustment that can be made by the driver.

It is to be noted that the modern racing shock absorber tends to be front or rear wheel specific for a defined vehicle, and cannot be moved from front to rear wheel of the same vehicle, let alone from one vehicle to another.

Air and hydro-pneumatic suspension systems regulate the vehicle's ride height by adjusting:
i. The air pressure, for vehicles such as HGVs, Range Rover, Mercedes Benz, Rolls Royce or Harley Davidson. Changing the air pressure with the same chamber volume alters the spring stiffness. However, the static to bump spring characteristic tends to be linear, remaining the same in relation to the charge pressure (around 3:1). This type of system uses rubber air bags which are limited to a maximum working pressure of about 100 psi, and tend to be large in diameter (as force=pressure×area) and are easily damage by road debris. They also need auxiliary equipment such as compressor pumps, accumulators, valves, fixed and flexible pipework to function. This limits the working medium to air, requiring the necessity of eliminating the ingress of moisture (causing rust and hydraulic lock).
ii. The volume of hydraulic fluid, for vehicles such as Citroen. Adjusting the oil volume to compensate for the change in gas volume does alter the vehicles height, but does not affect the spring characteristics.

We have realised that it would be highly desirable to provide a suspension assembly which is readily adjustable so as to suit a specific track or circuit, weather conditions, the weight of the vehicle (from unladen to fully laden) and the driver's racing style.

In a highly preferred embodiment of the invention a suspension assembly includes the following adjustable features:

a) The ability to produce either near-linear or true non-linear spring characteristics.
b) The ability to set or adjust the static to bump spring rate anywhere from below 3:1 to over 9:1.
c) The ability to control the rate of change in spring rise, either gradual or abrupt.

In a further embodiment of the invention a suspension assembly includes the feature of dynamic roll control. Fitted to each the steered wheels, two such assemblies can be interlinked to reduce or induce dynamic roll control during cornering. The spring characteristics and ride height of the suspension assemblies connected to the steered wheels are automatically caused to change during cornering to reduce or induce body roll control, resulting in improvements to the dynamic handling of the vehicle.

In yet a further preferred embodiment a suspension assembly is fitted to each wheel station and the suspension assemblies are interlinked to improve safe vehicle handling dynamics, while performing rapid vehicle manoeuvres ie accelerating, braking and cornering etc. This advantageously provides automatic dynamic pitch and roll control.

The pitch and roll control arrangement mentioned above differs from the dynamic roll control arrangement in that it affects the suspension assemblies on all wheel stations to redistribute the forces generated during vehicle manoeuvring to alter the spring characteristics and ride height which in turn reduces body pitch and roll, resulting in improved dynamic handling of the vehicle.

The suspension assembly mentioned above preferably allows control of the vehicle's attitude, along with the ability to lower the overall centre of gravity during vehicle manoeuvring, allowing the vehicle to traverse through corners faster. In use adjustable features preferably allow for:
a) Coarse changes to the static to bump spring characteristics, enabling adjustments to suit 'road/track' or 'road/off-road' and vice-versa, eg from below 3:1 to over 9:1.
b) Fine changes to the static to bump spring characteristics allow the suspension to be fine tuned to suit changes in:
  i. The vehicle mass, from unladen to fully laden.
  ii. The centre of gravity.
  iii. Personal driving techniques.
  iv. Track-to-track conditions, etc.

The suspension assembly can preferably be installed into any vehicle to provide variable suspension parameters, eg on the everyday car, motorcycles, sports cars and bespoke high performance vehicles.

Adjustment of the spring rate may be likened to adjusting the headlamps in most everyday cars. The headlamps are re-aligned to compensate for the change in weight of the vehicle, caused by passenger(s) and/or luggage. A similar control arrangement could be used to dynamically change the spring characteristic and restore the vehicles' comfort and handling dynamics back to an acceptable level or to change the spring characteristic from comfort-to-sports mode or from one sports mode to another. Such a control feature would ideally suit motorcycles, as the comfort/driving dynamics varies greatly from unladen to fully laden. It would also allow sport cars and high performance vehicles comfort and handling dynamics to be set for 'road/track' or 'road/off-road' or 'road/track/off-road' use.

To achieve the new features and options, the new suspension unit preferably incorporates two forms of novel technologies:
1) The separation of the damping valves away from the piston.
2) The introduction of a floating damper plate.

Relocating the valves away from the piston increases the applied forces generated by the compressed gas. This additional force is used to create the non-linear static to bump spring characteristic. The change also increases the oil flow rate through the damping valves, resulting in producing greater damping forces.

The floating shock absorber plate enables the high flow rate bump and rebound damping forces to be easily adjusted.

As the suspension systems are a compromise between driver comfort and handling dynamics, there is a well-established large world-wide market for those who want to modify their vehicles suspension system for street, track, circuit or competition use. They range from the basic amateur and DIY enthusiast, through to the true international professional racing teams, all looking for the ultimate in driving performance.

Currently, changing the compromise for mass produced vehicles involves physically changing the existing springs and shock absorbers. They tend to fall into the following four categories:
a) Retain the existing springs, but change to stiffer or adjustable shock absorbers—thus giving a slightly less comfortable ride but improved handling. This setup is typical for street use.
b) Change to stiffer springs and adjustable shock absorbers, this is usually coupled with lowering the ride height by around 25/40 mm, fitting stiffer anti-roll bars and low profile tyres—thus giving far less comfortable ride but much improved handling. Various levels of this setup are typical for street, track, circuit and competition racing.
c) Change the springs for air suspension, this results in a softer ride with the ability to adjust or maintain the ride height (self-levelling)—thus giving a softer more comfortable ride than standard, but with reduced dynamic handling. This setup is typical for the luxury vehicles, street use or as booster springs for self-levelling the rear axles of pick-ups and light trucks.
d) Change the springs and shock absorbers for a hydro-pneumatic suspension system, this allows dynamic movements to the vehicle—this often gives a slightly softer more comfortable ride than standard, along with a slight reduction in dynamic handling. This setup is also typical for street use.

It is noted that option (c) is becoming a common solution as it does allow adjustment to ride height along with self-levelling. It also has the ability to maintain a constant static to bump ratio relative to a variable static wheel load. However, it does require auxiliary equipment and power to perform these features.

Whatever the category of suspension type, the results tend to be limited as they render the vehicle specific for use, eg it can only be used in one category, and only allows limited adjustment within that category.

Furthermore, the existing replacement shock absorbers need to have their damping valves 'sized' to suit specific wheel loading. Some shock absorbers are even vehicle make and model specific, ie Audi TT or Honda S2000, and have limited independent adjustment for bump and rebound. If the vehicle changes its parameters too much (wheel loadings due to weigh reduction), the damping valves need to be re-sizing.

Thus if it is desired to alter the suspension settings from say road use to track use this cannot readily be achieved since known suspension assemblies only allow changes to the shock absorber low flow rate bump and rebound settings only. Changing the static to bump spring characteristics, to suit from road to track and vice-versa, let alone changing the spring characteristics from track to track, are none existent.

FIG. 1 shows a typical modern vehicle's over-coil shock absorber assembly. It comprises of a coil spring with a shock absorber in the middle. The shock absorber can be supplied in a single-tube or twin-tube design, both using the same technologies for body motion control and system damping. Such typical single-tube type shock absorber assemblies are supplied by Ohlins, Bilstein, Monroe or Koni.

One end of the shock absorber assembly is attached to the body of the vehicle while the other end is attached to the axle. A coil spring is contained between flanges on the con-rod and the cylinder. The vehicle's vertical movement causes the con-rod to move inside the cylinder. This movement results in:

a) Compressing or extending the coil spring, storing or releasing the energy within the coil spring to provide vehicle body motion control.
b) The piston and valve assembly moves inside the cylinder, forcing oil through the valve assembly, providing the damping forces that keep the tyre in contact with the road.

A separator piston and nitrogen gas compensate for the differences in oil volume needed from one side of the piston to the other. The system is pressurised, between 12-30 bar, to stop the oil aerating and cavitating while under dynamic conditions.

As the pressurised oil acts on both sides of the piston, its working area is limited to the difference between the two areas, ie the con rod diameter. The gas pressure acting on this small area is still sufficient to cause the shock absorber to fully open when removed from the vehicle.

The coil spring provides the vast majority of the supporting forces for the suspension system with only a residual force provided by the Nitrogen gas. Coil springs tend to be linear in their static to bump spring characteristics. Non-linear spring characteristics are available, by:

i. Tapering the spring material diameter.
ii. Varying the pitch of the coils.
iii. Varying the radius of the coils.
iv. Stacking different rated springs, one on top of the other.

Either way, the amount of non-linearity is limited in scope, along with the associated static to bump spring characteristics, primarily due to spring binding (coils touching).

Coil springs suffer from a major problem, once manufactured it is very difficult to change the static to bump spring characteristics. This can only be achieved by physically changing the spring's parameters, such as:

The mechanical properties of the material.
The coil diameter.
The coil radius.
The coil pitch.
Changing one spring for another with a different spring characteristic.

The piston has a ring of two sets of holes through it, allowing oil to flow from the outer edge of one side to the inside of the other side. For each side of the Piston, the inner holes are covered by a thin washer which is held against the Piston by either its inner or outer edge, with the other edge free. Stacked on top of these washers may be other washers or spacers to modify its stiffness. One stack of washers are used during bump damping and another stack are used during rebound damping.

At a low rate of flow, the bump damping forces are generated by the oil being forced through a by-pass hole, as illustrated at item 3 in FIG. 2. The oil pressure developed is not sufficient to deflect the washer, at the bottom of the piston, to allow oil to flow through the apertures in the piston.

At a higher rates of flow, such as when the vehicle is driven over a bump, the oil pressure developed pushes against the washer with sufficient force to be deflect it into a slightly conical form. This allows oil to pass through the low flow rate orifice and the damping holes and out from under the deflected edge of the washer, as illustrated at items 2 and 3 in FIG. 2. The washer can be likened to a kind of stiff reed valve, made in circular geometry. The faster the piston moves, the more the washer stack deflects increasing the orifice area.

When the mass of the wheel and the coil spring forces the shock absorber to extend again, during rebound, the oil flows in the opposite direction, as illustrated in FIG. 3. It uses the same low flow rate by-pass damping but uses the washers on top of the piston and not the bottom ones.

The characteristics of the damping forces can be changed by altering the size of the washers (the number, thickness and diameter). Therefore, changing the washer stacks on either side of the Piston allows different bump and rebound damping force characteristics to be used. However, this can only be done by the shock absorber manufacturer's authorized service workshops.

The initial adjustable shock absorbers utilise a needle valve located in the centre of the piston, as illustrated at item 3 in FIGS. 2 and 3. This allows for adjustment of the low flow rate for bump and rebound. This adjustment is only used for low-speed motion control, ie to prevent wallowing. The adjustment also alters the higher speed damping generated by the damping valves a little.

Using the same adjustment for low flow rate bump and rebound damping causes a dilemma, too much damping, to prevent wallowing, induces hopping and wobbling. To stop this hopping and wobbling, the ideal setup is to have the bump damping forces about 20%-25% of the rebound damping required to prevent wallowing.

This requirement has led to some shock absorbers having independent bump and rebound damping forces adjustment. Again, these adjusters only act on the low oil flow rate only and are used to adjust low-speed motion control. The adjustment still alters the associated higher speed bump and rebound damping forces generated by the damping valves a little.

In summary it can be seen that known over-coil shock absorbers comprise a coil spring to support the mass of the vehicle and comprise a shock absorber to generate the forces required to reduce the vehicle oscillations. These units rely on adjusting the damping forces only to compensate for the compromise between driver comfort and handling dynamics.

SUMMARY OF THE INVENTION

According to one aspect of the invention there is provided a shock absorber assembly comprising a piston and cylinder arrangement, a damping-fluid chamber and a damping valve arrangement which is located in the damping fluid chamber and serves to divide the chamber into two sub-chambers, and the assembly being such that in use the valve arrangement regulates the flow of fluid between the sub-chambers.

According to another aspect of the invention there is provided a shock absorber assembly comprising a piston and cylinder arrangement, a resilient member which acts to resiliently bias the piston, a damping-fluid chamber, a gas chamber which contains gas, and the assembly being such that in use the piston interacts with damping fluid in the damping fluid chamber and gas in the gas chamber acts on the damping fluid.

BRIEF DESCRIPTION OF THE DRAWINGS

Various embodiments of the invention will now be described, by way of example only, with reference to the accompanying drawings.

DESCRIPTION OF EXEMPLARY EMBODIMENTS

Figure 1:
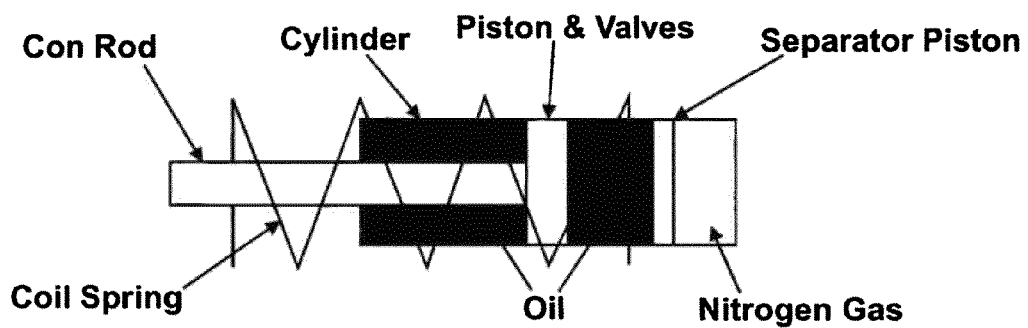
FIG. 1 shows an embodiment of a modern vehicle's over-coil shock absorber assembly.
Figure 4:
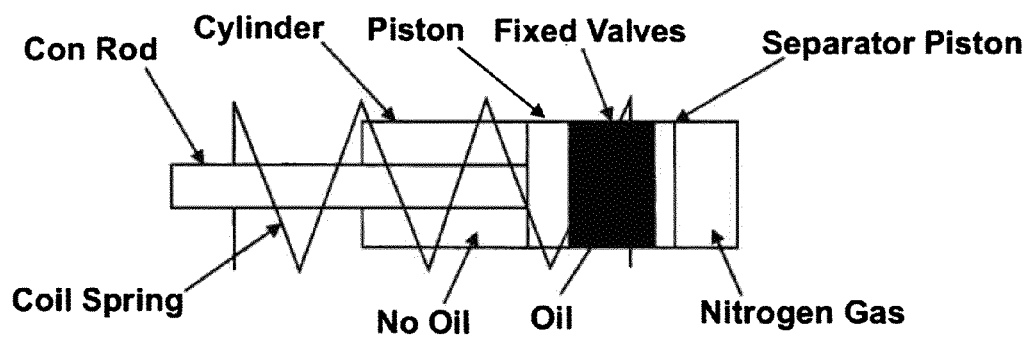
FIG. 4 shows another embodiment of a shock absorber assembly.
Figure 2:
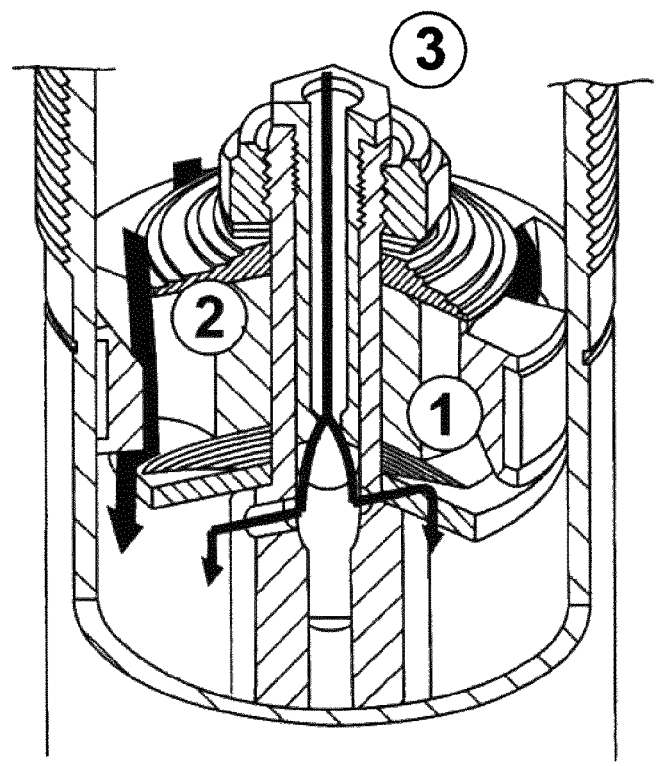
FIG. 2 shows an exemplary oil flow through the piston in a first direction.
Figure 3:
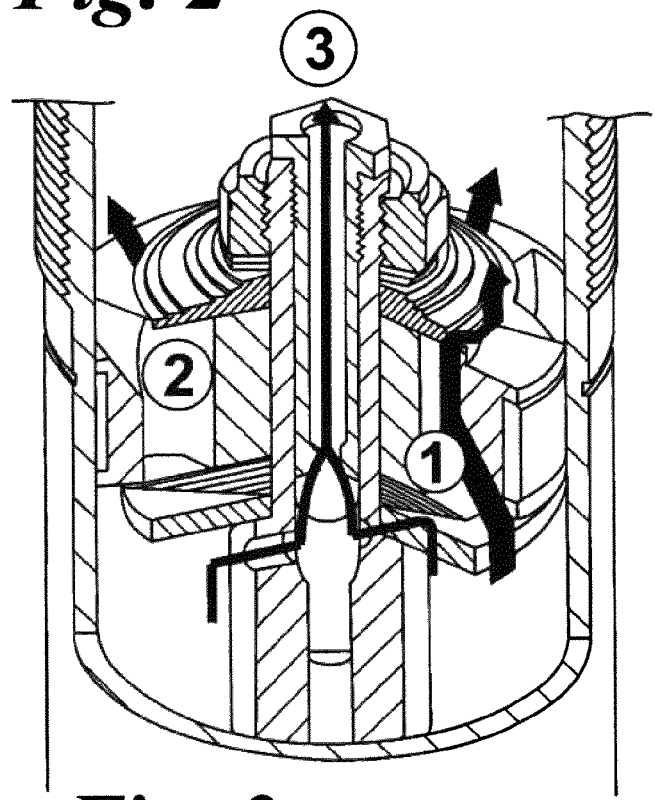
FIG. 3 shows an exemplary oil flow through the piston in a second direction.

With reference to FIG. 4 there is shown an over-coil shock absorber assembly in which the damping valves are detached from the piston and are provided in an oil chamber so as to divide the oil chamber into two sub-chambers. This changes the gas spring generation from con-rod displacement to a solid piston (oil is retained on one side only). The assembly also comprises gas chamber which is separate from the oil chamber but which applies pressure to the oil in the oil chamber.

This arrangement enables Nitrogen gas in the gas chamber to act on the full area to the right side of the piston only. The left side can be open to atmosphere or under vacuum, thus providing the maximum differential pressure between the two sides.

This increases the proportion of supporting forces generated by the Nitrogen gas, along with a corresponding reduction in coil spring force, as compared with a similarly rated known shock absorber assembly.

This layout does not have to incorporate the damping valves, and can result in reducing the coil spring mass, size and weight, but will increase the volume of the nitrogen chamber and the flow rate of the oil through the damping valves (for the same piston displacement).

Figure 5:
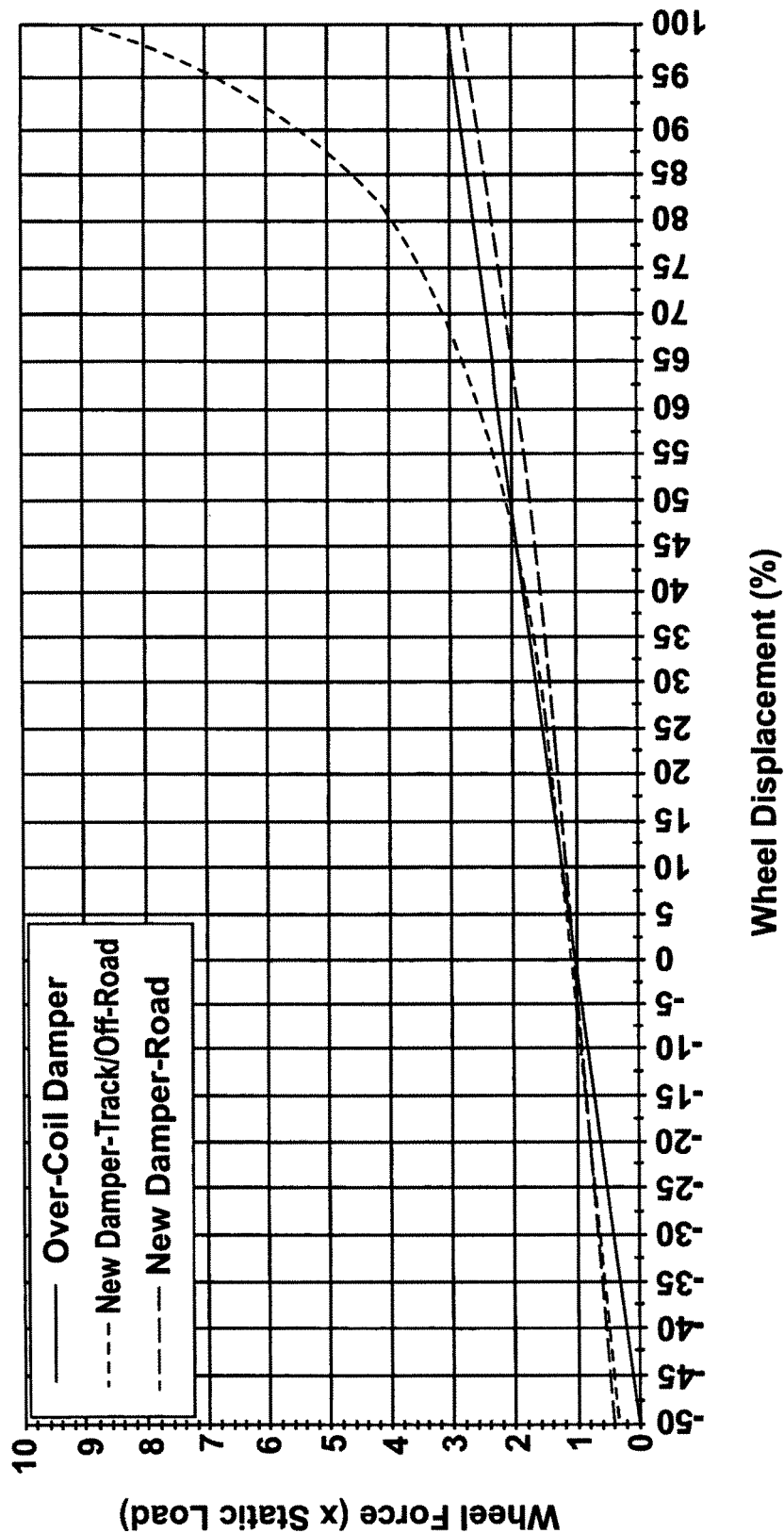
FIGS. 5 to 7 show spring characteristics from a combination of the two spring types.

As stated above, a coil spring tends to be linear or near-linear in character, whereas compressing Nitrogen gas can produce a true non-linear spring characteristic. FIG. 5 shows the possible spring characteristics from a combination of the two spring types.

A near-linear to non-linear spring characteristic change can be achieved by adjusting the gas chamber volume. This allows a single new shock absorber assembly to be setup to generate either a near-linear spring characteristic, for 'road' use, or a true non-linear spring characteristic, for 'track' or 'off-road' use, as required.

Figure 6:
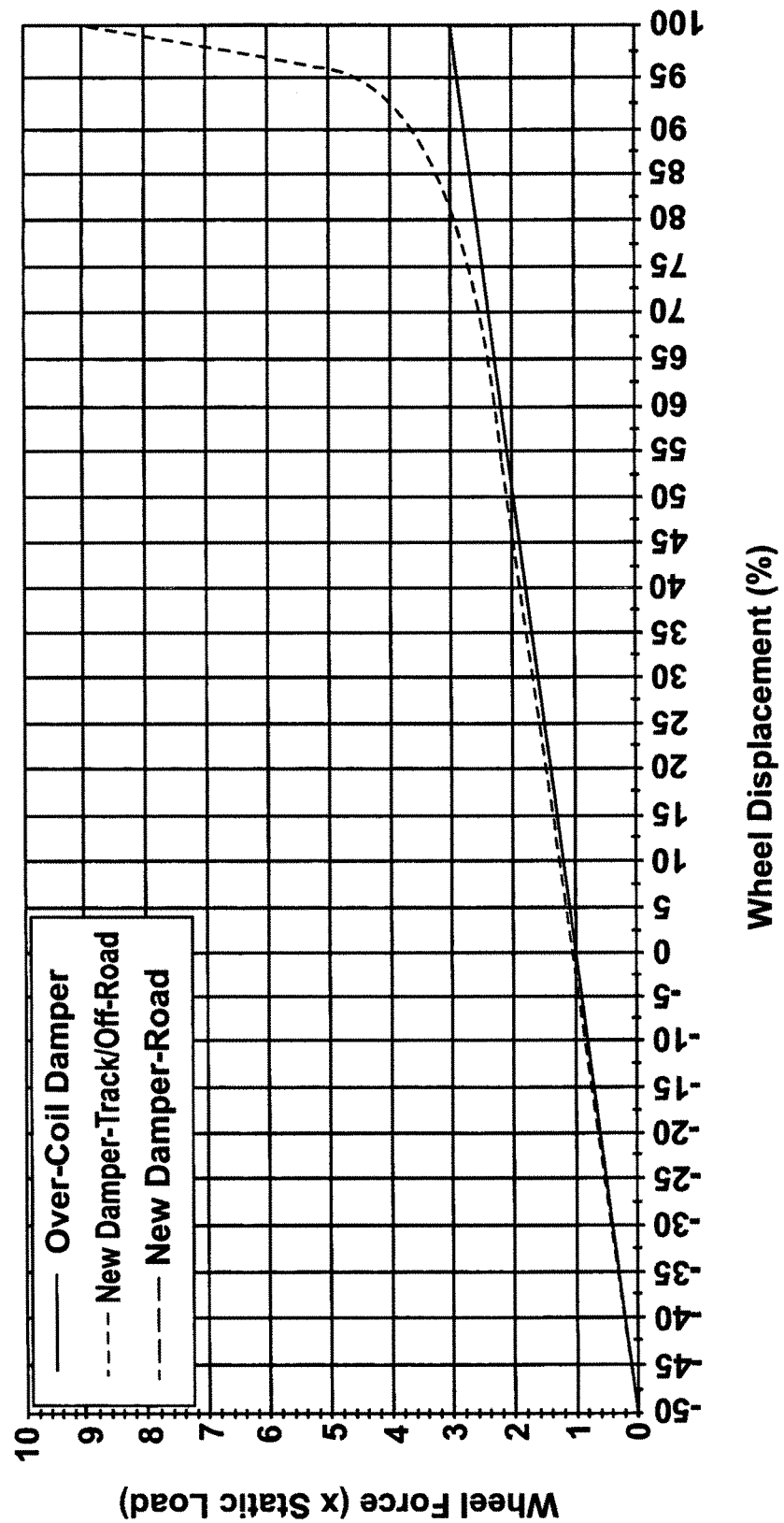
Figure 7:
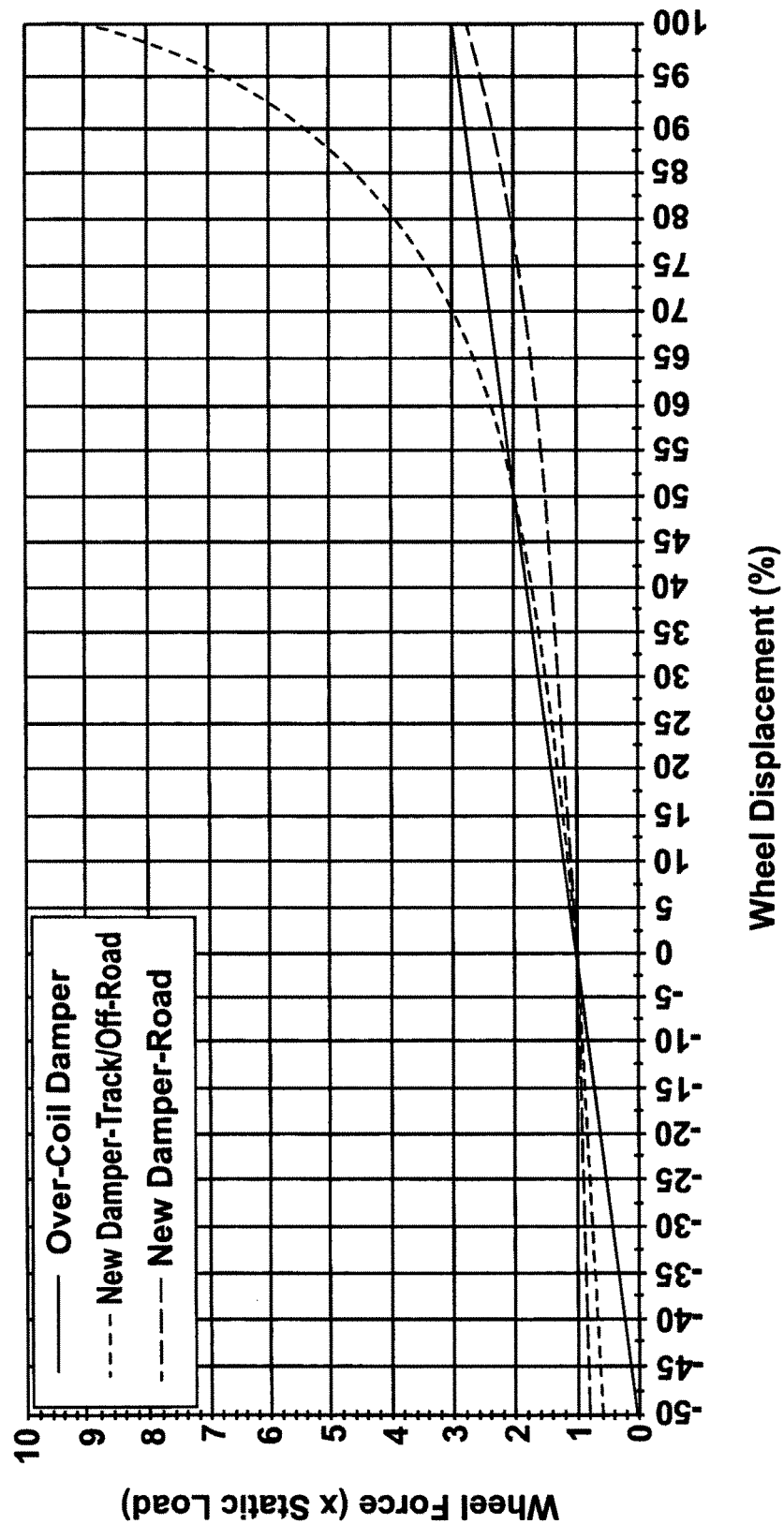

Furthermore, changing the ratio between the proportion of coil spring and compressed Nitrogen gas force provides the ability to control the rate of transition between comfort and handling dynamics, either abrupt as graphically illustrated in FIG. 6 or gradual as illustrated in FIG. 7.

The ability to generate a near/true non-linear type of spring characteristic is ideally suited to improving the compromise between driver comfort and vehicle dynamic handling. As the non-linear spring characteristic provides a low spring characteristic around static, improving driver comfort, but becomes progressively stiffer as the suspension system is worked harder, improving dynamic handling.

It can be seen, in FIG. 7, that a low/no coil spring to high gas spring characteristics generates higher rebound forces when compared to a high coil spring to low gas spring or standard coil spring. This allows for a vehicle to have greater rebound travel and a more evenly balance ground force resulting in greater dynamic stability.

In addition, the near/non-linear spring characteristic also allows more power to be absorbed by the suspension system when compared to conventional suspensions. The greater the energy absorbed by the suspension system, the less energy is taken from the engine to force the sprung mass (vehicle body) over the terrain. This surplus engine energy can be used to propel the vehicle over the same terrain faster, ideal for rallying and off-road vehicles.

It can be seen that the new shock absorber assembly lends itself to a wide variety of spring characteristics, as it has the ability to adjust:

a) The ratio of coil spring to gas force (alters the transition from comfort to handling dynamics).

b) The diameter of the oil cylinder (alters oil flow rates).

c) The diameter of the gas cylinder (alters the static charge pressure).

d) The Nitrogen gas chamber volume (alters the near-linear to non-linear spring characteristic or the vertical wheel displacement for the same force from static).

e) The Nitrogen charge pressure (alter the gas force and static ride height).

As stated above, simply changing the volume of the Nitrogen gas chamber alters the near-linear to non-linear spring characteristic of the shock absorber assembly or the vertical wheel displacement for the same force from static. This can be achieved by simply changing either the Nitrogen gas charge pressure or the physical volume of the gas chamber.

a) Changing the charge pressure alters the mass of Nitrogen gas within the chamber. The chamber's volume adjusts until equilibrium between the supporting mass and the coil and gas forces is reached, thus altering the near-linear to non-linear spring characteristic and a corresponding change to the static ride height and the available vertical wheel displacement from static.

Reducing the charge pressure decreases the gas force, causing the gas chamber volume to increase, as the supporting mass and the coil and gas forces reach equilibrium. This lowers the ride height and subsequently increases the coil spring to gas force ratio and the non-linearity of the spring characteristic. This is ideal for lowering the new shock absorber spring characteristic, eg from 'off-road' to 'road' to 'track' use.

Increasing the charge pressure enlarges the gas force, causing the gas chamber volume to increase, as the supporting mass and the coil and gas forces reach equilibrium. This raises the ride height and subsequently the coil spring to gas force ratio and the non-linearity of the spring characteristic. This is ideal for raising the new shock absorber spring characteristic, eg from 'track' to 'road' to 'off road' use.

b) Physically changing the volume of the Nitrogen gas chamber alters the charge pressure, as equilibrium between the supporting mass and the coil and gas forces is reached, thus altering the near-linear to non-linear spring characteristic and a corresponding change to the static ride height and the available vertical wheel displacement from static.

Increasing the additional gas chamber volume decreases the existing gas force and the gas chamber volume, increasing the coil spring to gas force ratio, lowering the ride height and increasing the non linearity of the spring characteristic. This is ideal for lowering the new shock absorber spring characteristic, eg from 'off-road' to 'road' to 'track'.

Decreasing the additional gas chamber volume increases the existing gas force and the gas chamber volume, decreasing the coil spring to gas force ratio, raising the ride height and decreasing the non linearity of the spring characteristic. This is ideal for raising the new shock absorber spring characteristic, eg from 'track' to 'road to 'off-road'.

It must be noted that changing the Nitrogen gas charge pressure could require charging kits with a pressure gauge and a Nitrogen gas source (compressed bottled gas). In addition, the Nitrogen gas could be changed for compressed air, an auxiliary compressor, accumulator, pipework, regulating and levelling valves.

Figure 8:
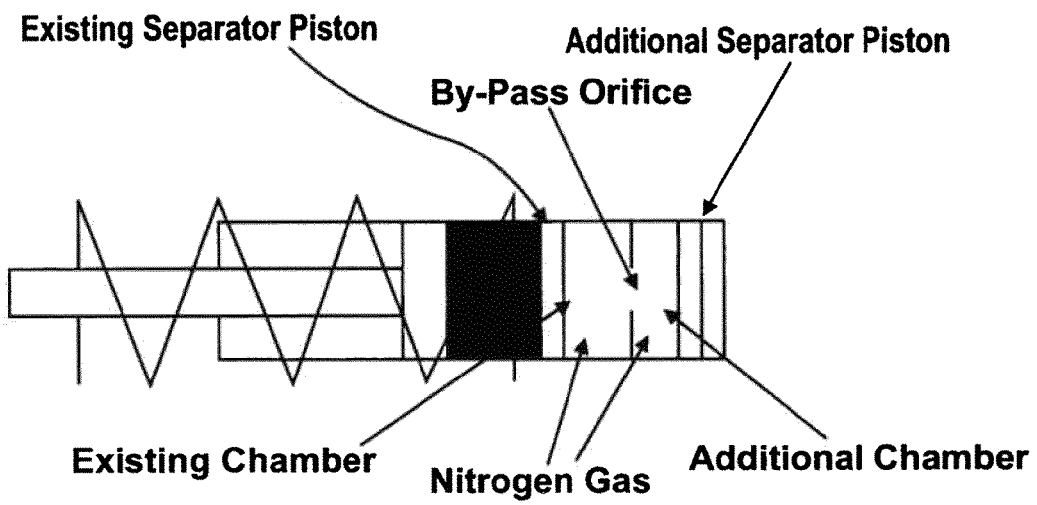
FIGS. 8 and 9 show other embodiments of a shock absorber assembly.

Changing the physical volume of the Nitrogen gas chamber can be achieved by, for example, incorporating a closed system comprising of: an additional Nitrogen gas chamber, Separator Piston and By-Pass Orifice/Transfer Port, as for example illustrated in FIG. 8.

The exact layout of these additional items can be made to suit specific installation requirements, ie in parallel, remote via connection tubing or in series as shown. The by-pass orifice/transfer port controls the flow of gas from one gas chamber to the other. This can be done either gradually, via an orifice port, or by providing fixed volumes of gas independent to piston velocity, via manual or powered valves.

The use of an orifice port is the preferred method, as it enables the spring rate to be automatically altered in relation to the vertical wheel velocity. Methods of physically adjusting the gas volume, ie by moving the Additional Separator Piston within the Additional Chamber, can be achieved via many mediums such as, but not limited to:

i. Mechanical, ie screw thread, levels, ratchets, etc.
ii. Electro-Mechanical, ie motor driven lead screw, actuator, etc.
iii. Hydraulic, ie power take-off (PTO) pump, power steering linkage, etc.
iv. Pneumatic, ie auxiliary compressor, accumulators, valves and pipework, etc.

In summary, changing the charge pressure and/or the gas chamber volume enables the shock absorber assembly's spring characteristic to being adjusted to suit a wide variety of comfort to handling dynamics requirements, ie from 'track' to 'road' to 'off-road' setting. A vehicle fitted with the new shock absorbers could, for example:

Be driven on the public highway to a track/circuit and then easily and quickly set-up for racing. The shock absorbers could also include the facility to fine-tune the suspension system to cater for the different 'track', 'road' or 'off-road' set-ups needed from track to track. This would be ideal for sports/high performance vehicles.

Have standard new shock absorbers fitted to the steered wheels, and adjustable gas chamber volume shock absorbers, incorporate self-levelling, fitted to the rear wheels would be ideal for load carrying vehicles, eg motorbikes (pitch-control), pick-ups, vans and light/medium/heavy duty trucks, etc.

Figure 9:
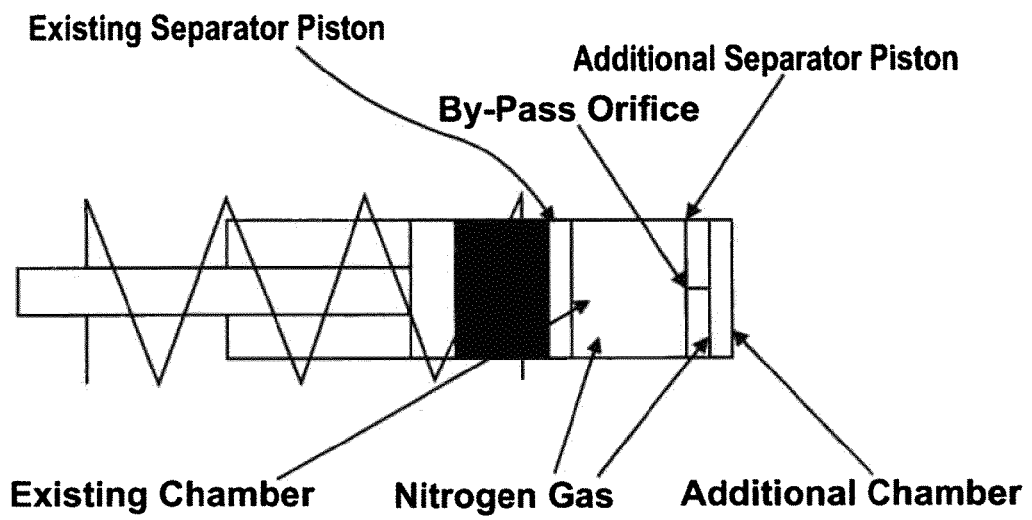

An alternative arrangement, for the additional Nitrogen gas chamber, Separator Piston and By-Pass Orifice/Transfer Port, is illustrated in FIG. 9.

Moving the position of the additional separator piston restricts the movement of the existing separator piston, and hence the vertical travel of the wheel. However, as the gas is restricted, under dynamic conditions, from transferring from the existing chamber and into the additional chamber by the by-pass orifice the peak loads remain the same.

This has the effect of allowing the two chambers to equalise when the system is static and allow the existing chamber to reach peak pressures at a reduced wheel travel. This can be used to 'stiffen' the suspension making the vehicle more stable. This would be ideal for sports/high performance vehicles.

Figure 10:
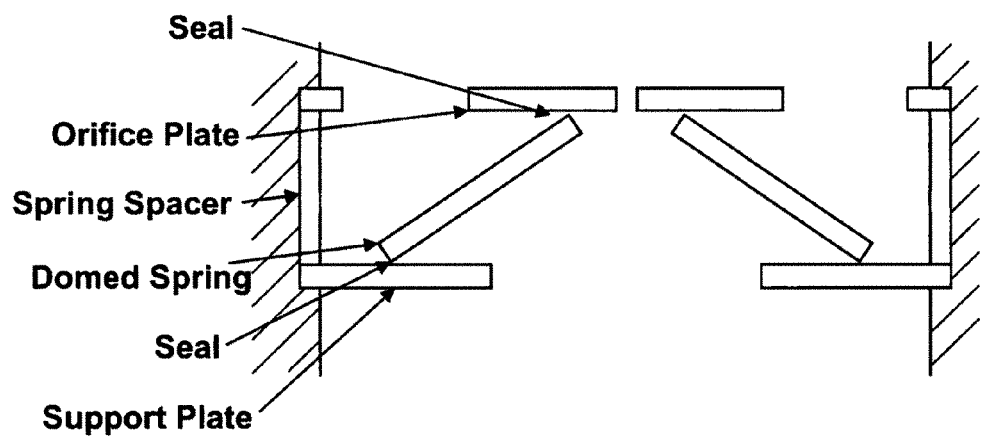
FIG. 10 shows an embodiment of a damping valve assembly of the shock absorber assembly.

The damping valve assembly of the shock absorber assembly is illustrated in FIG. 10, and comprises:

a) orifice plate consisting of an orifice and by-pass flow holes.
b) A support plate consisting of a through hole.
c) A domed spring pack consisting of one or more domed springs stacked in parallel or series.

The distance between the orifice plate and the support plate is fixed. The domed spring is sandwiched between the orifice plate and the support plate, the edges of which form a seal between the domed spring and each plate, ie between the domed spring and orifice plate and between the domed spring and support plate.

At low rates of flow, the bump and rebound damping forces are generated by the oil being forced through the orifice. The oil pressure developed is not sufficient to deflect the domed spring and allow oil to flow past the spring and through the through hole in the support plate.

Figure 11:
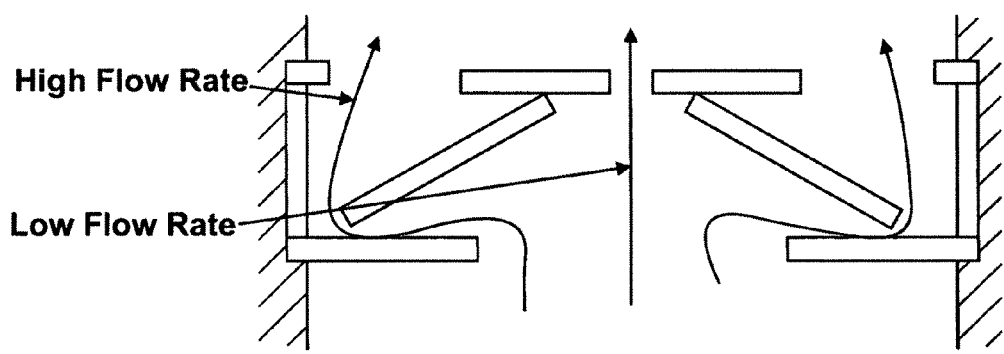
FIGS. 11 and 12 show flow patterns through the damping valve assembly of FIG. 10.

At a high rates of bump flow, such as when the vehicle is driven over a bump, the oil pressure developed pushes against the domed spring with sufficient force to be deflected into a slightly flatter form. This allows oil to flow through the orifice and past under the deflected edge of the outer part of the spring and through the apertures in the support plate, as illustrated in FIG. 11. The faster the piston moves, the more the domed spring pack deflects increasing the orifice area.

Figure 12:
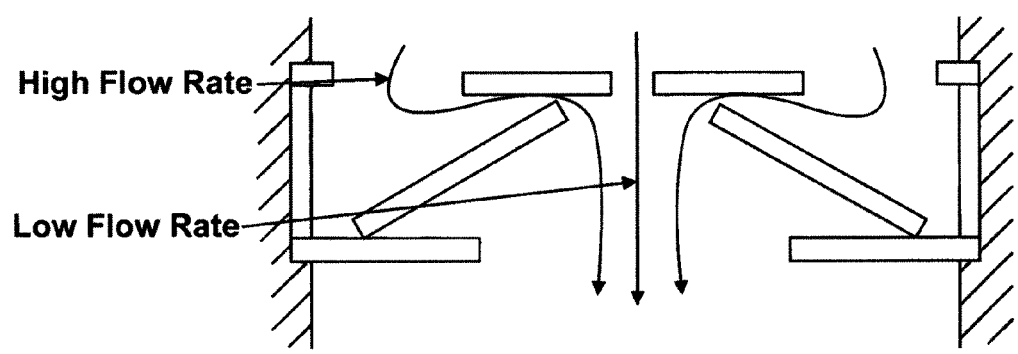

At a high rates of rebound flow, such as when the mass of the wheel and the coil spring forces the shock absorber to extend again, the oil pressure developed pushes against the domed spring with sufficient force to be deflected into a slightly flatter form. This allows oil to flow past through the orifice and over the deflected edge of the inner part of the spring and through the through hole in the support plate, as illustrated in FIG. 12. The faster the piston moves, the more the domed spring pack deflects increasing the orifice area.

The characteristics of the damping forces are defined by:
i. The parameters of the domed spring:
   a. the outside diameter
   b. the inside diameter
   c. the thickness
   d. the free height e. the material properties
ii. The number of springs in parallel.
iii. The number of springs in series.
iv. The pre-load applied to the spring pack (assembly height).
v. The spring orientation. A concave spring during bump gives low bump and high rebound forces, ie ideal for road and race. A convex spring during bump gives high bump and low rebound forces, ie ideal for fast off-road.

Figure 13:
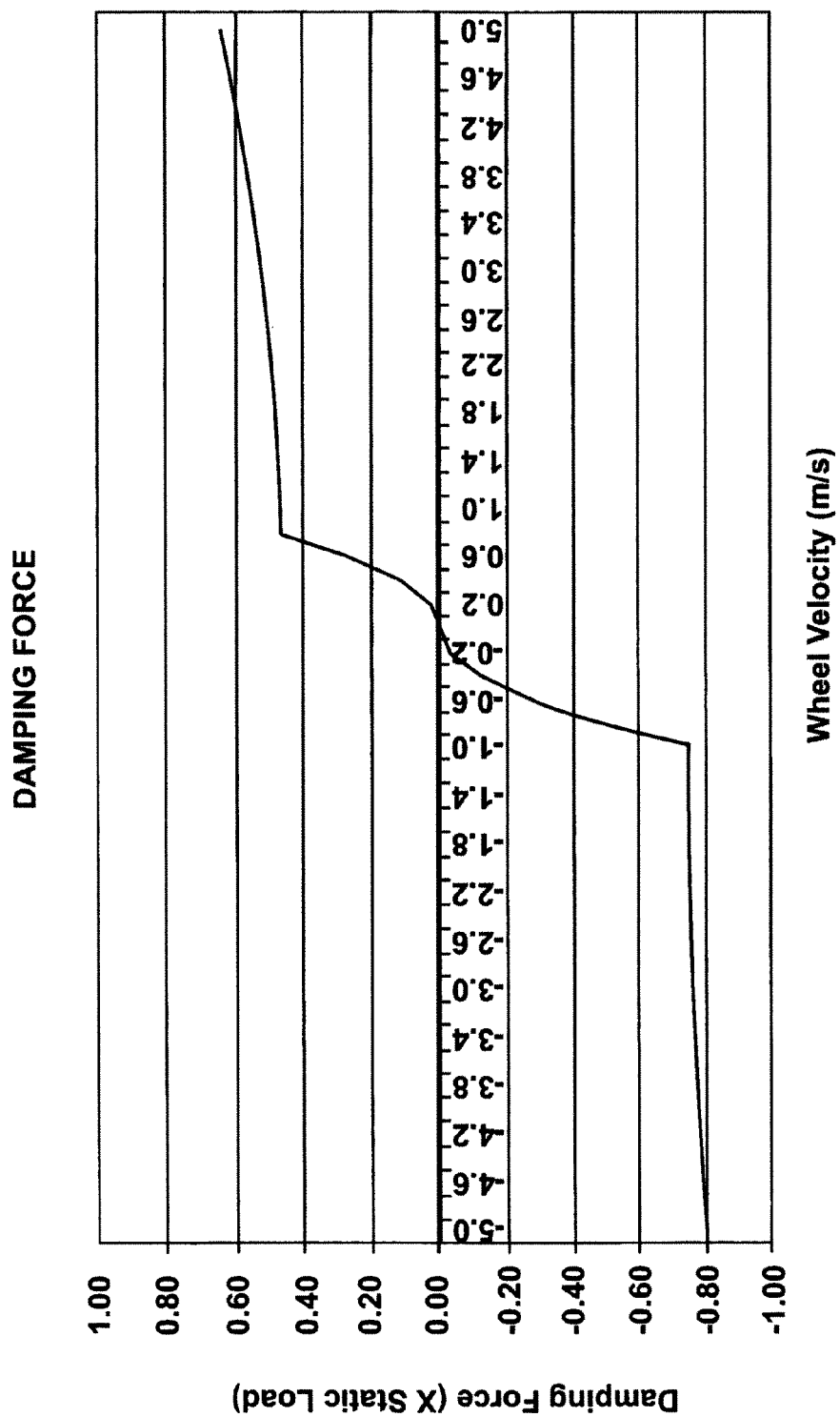
FIGS. 13 and 14 show damping force characteristics of the damping valve assembly of FIG. 10.

A graph of the typical bump and rebound damping force characteristics is illustrated in FIG. 13. The graph shows the low flow rate orifice damping force characteristics, for both bump and rebound, is the same and they rise exponentially as the wheel velocity increases. The rate of exponential rise is defined by the orifice diameter, ie the larger the orifice diameter the lower the exponential rise rate, the greater the wheel velocity needed to 'crack' the domed spring pack.

Therefore, changing the damping orifice diameter enables different low bump and rebound flow rate damping force characteristics to be generated. This can be achieved by using similar techniques as per existing shock absorbers, eg an adjustable needle.

The amount of damping force required to 'crack' the domed spring pack is determined by the amount of applied pack pre-load. The greater the pre-load, the higher the damping force required to 'crack' the spring pack. The graph also illustrates that, for the same assembly height, the bump and rebound high flow rate 'cracking' forces and damping characteristics are different.

In addition, these high flow rate damping forces also rise exponentially as the wheel velocity increases. The rate of the exponential rise is defined by the each domed spring's characteristics within the pack, along with the number of springs in parallel and in series. The lower the spring rate of the spring pack, the lower the exponential rise rate.

Figure 14:
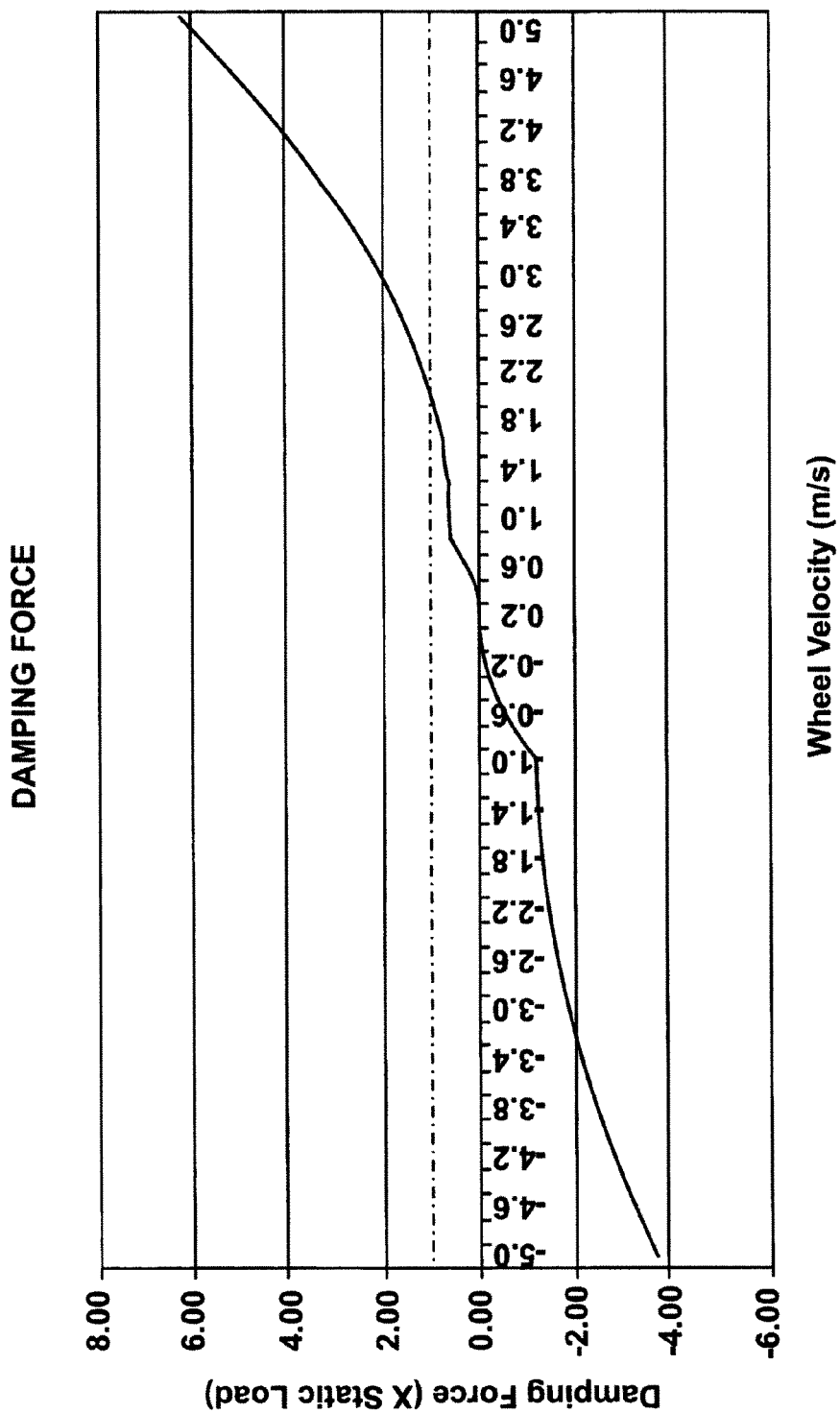

Changing the domed spring pack and its assembly height enables different high flow rate bump and rebound damping force characteristics, and 'cracking' forces to be generated, respectively. This is graphically illustrated in FIG. 13, for an example of a near-linear high flow rate, and FIG. 14 for an example of a non-linear high flow rate. It is noted that changing the domed spring pack can only be done by the shock absorber manufacturer, or an approved workshop.

As stated above, the orientation of the domed spring is important as it provide uneven bump and rebound damping forces. The unequal forces can be used to change the ride height of the vehicle during heavy suspension use, ie while traversing rough terrain.

For a concave spring orientation during bump, shall produce a lower bump force than rebound. This out of balance forces the vehicle to lower, and is therefore ideal for fast road and race, as illustrated in FIG. 10.

Figure 15:
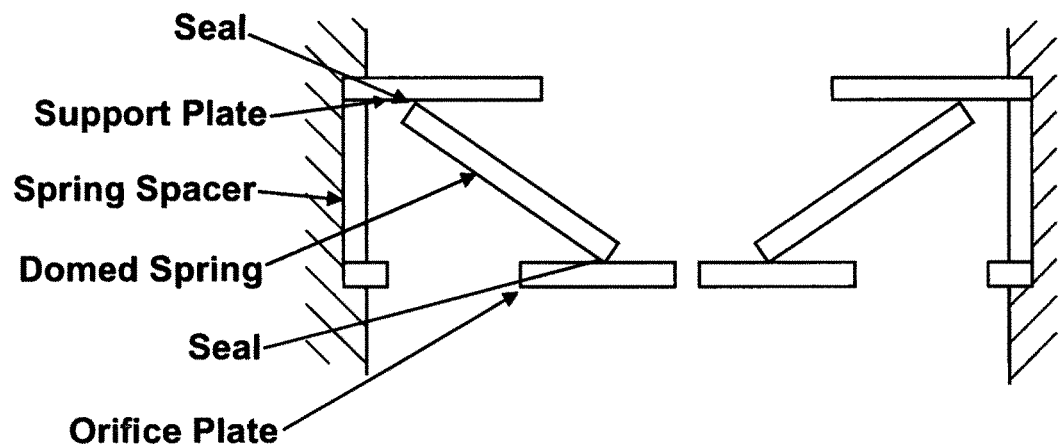
FIGS. 15 and 16 show other embodiments of a damping valve assembly of the shock absorber assembly.

For a convex spring orientation during bump produces a higher bump force than rebound. This out of balance forces the vehicle to raise, and is therefore ideal for fast off-road, as illustrated in FIG. 15.

Figure 16:
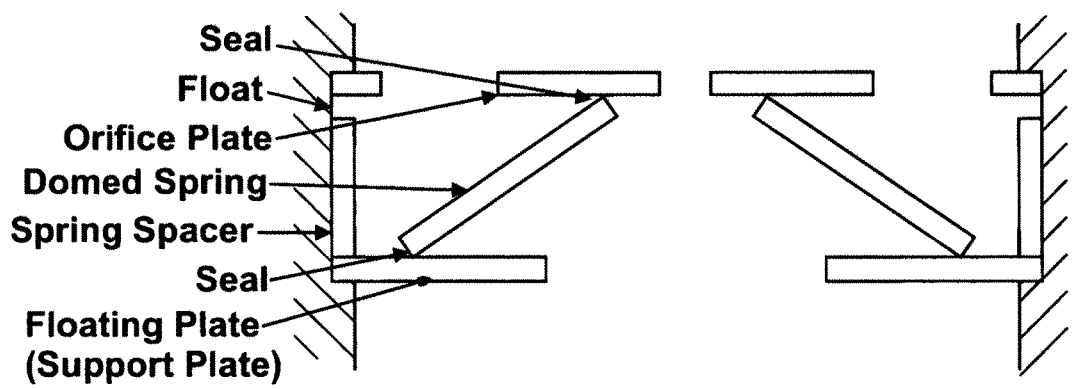

As stated above, changing the assembly height of the domed spring pack alters the high flow rate 'cracking' forces. Fixing the support plate and the spring spacer, a gap between the bottom of the orifice plate and the top of the spring spacer can easily achieve by reducing the height of the spring spacer or raising the upper orifice plate stop. This allows the orifice plate to 'float' between the two, as illustrated in FIG. 16.

The bump 'cracking' force is set by the position of the upper orifice plate stop. Raising this stop, compared to the standard damping assembly, reduces the amount of spring pack pre-load, thus lowering the amount of bump damping force required to 'crack' open the domed spring pack.

The rebound 'cracking' force is set by the height of the spring spacer. Reducing the spacer height, compared to the standard damping assembly, raises the amount of spring pack pre-load and increases the amount of rebound damping force required to 'crack' open the domed spring pack.

By combining the domed spring characteristics with the position of the upper orifice plate stop and the height of the spring spacer, ie the amount of 'float', can set the bump and rebound 'cracking' forces independent to each other. This can be used to adjust the high flow rate rebound damping forces required to prevent wallowing and decrease the high flow rate bump damping force to be around the preferred value of 20-25% of the rebound forces.

The low rates of flow basically remain the same as the standard damping assembly, ie the bump and rebound damping forces are generated by the oil being forced through the orifice. Although, during rebound, the oil pressure develops with sufficient force to drive the Orifice Plate on to the spring pack and deflect the domed spring(s) into a flatter form until the orifice plate touches the spring spacer. At this stage, the oil pressure developed is not sufficient to deflect the domed spring and allow oil to flow past the spring and through the through hole in the support plate.

Figure 17:
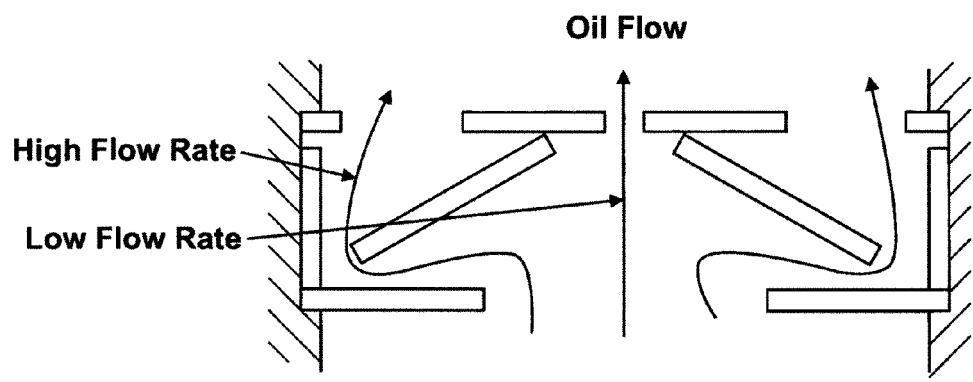
FIG. 17 shows a flow pattern through the damping valve assemblies of FIG. 15.
Figure 17A:
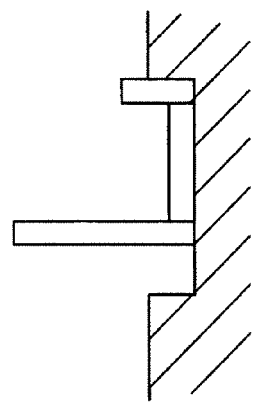
FIG. 17a shows the spring spacer and the floating plate in a displaced condition.

The high rates of bump flow can also remain the same as the standard damping assembly, ie when driven over a bump, the oil pressure developed pushes against the domed spring with sufficient force to be deflected into a slightly flatter form. This allows oil to flow through the orifice and past under the deflected edge of the outer part of the spring and through the apertures in the support plate, as illustrated in FIG. 17. The faster the piston moves, the more the domed spring pack deflects increasing the orifice area. FIG. 17a shows the spring spacer and the floating plate in a displaced condition.

Figure 18:
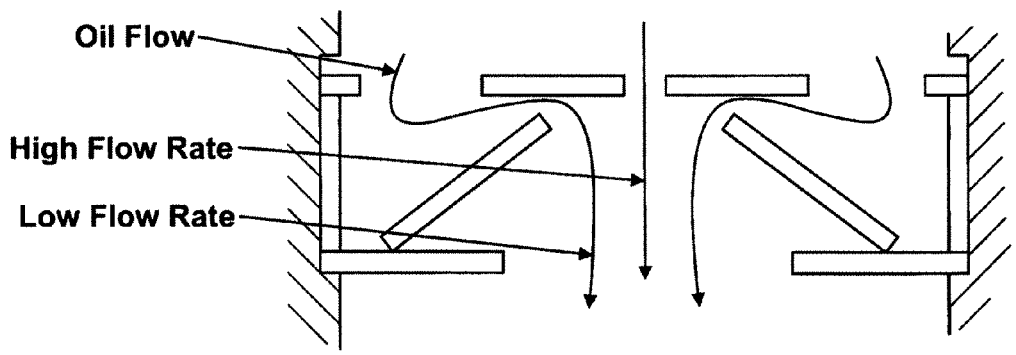
FIG. 18 shows a flow pattern through the damping valve assemblies of FIG. 16.

At a high rates of rebound flow, such as when the mass of the wheel and the coil spring forces the shock absorber to extend again, the oil pressure developed pushes against the orifice plate with sufficient force to deflect the domed spring into a slightly further flatter form. This allows oil to flow past through the orifice and over the deflected edge of the inner part of the spring and through the through hole in the support plate, as illustrated in FIG. 18. The faster the piston moves, the more the domed spring pack deflects increasing the orifice area.

Figure 19:
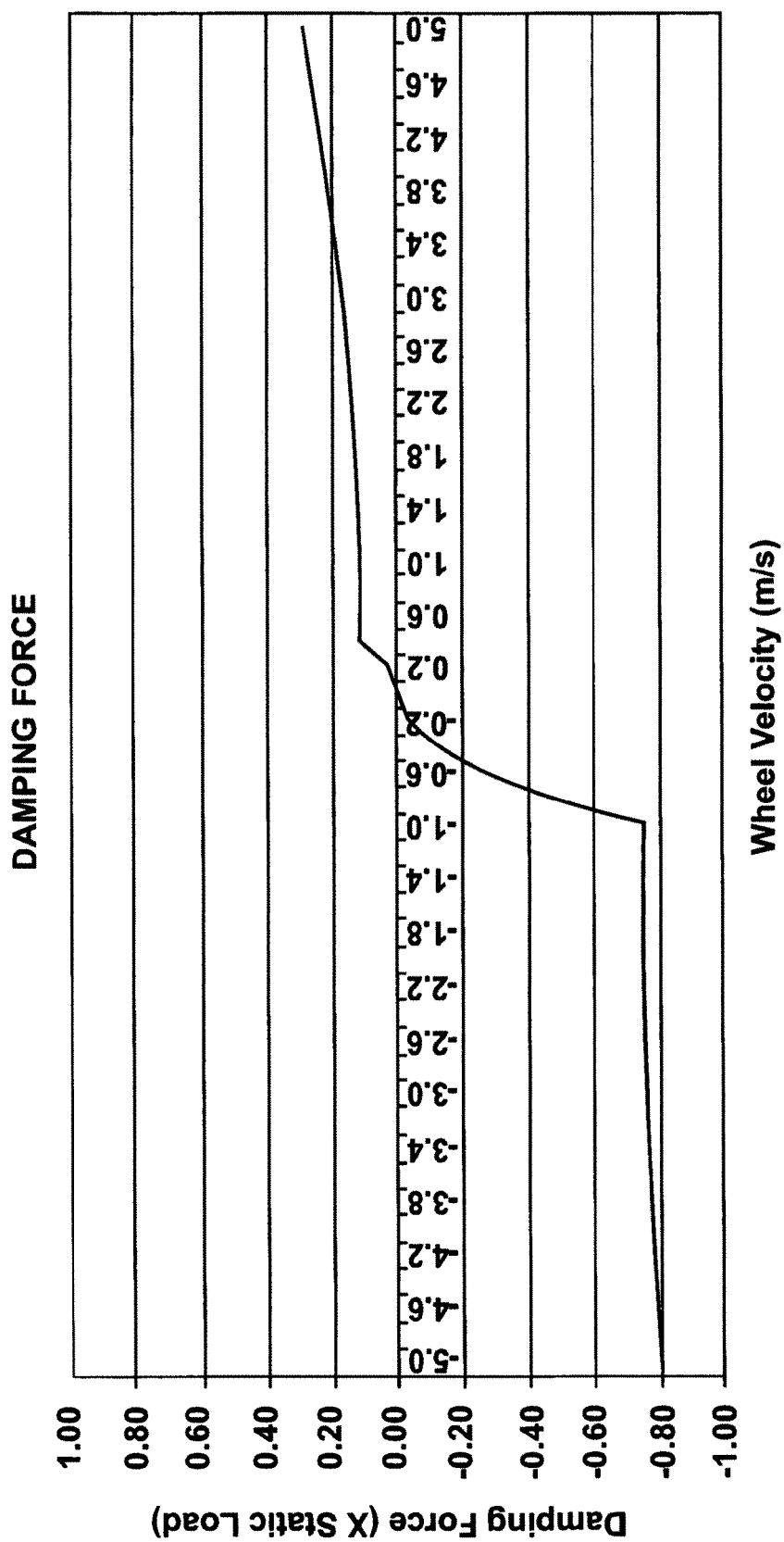
FIGS. 19 and 20 show damping force characteristics of the damping valve assembly of FIG. 18.

A typical Floating Plate bump and rebound damping force characteristics are graphically illustrate in FIG. 19.

Figure 20:
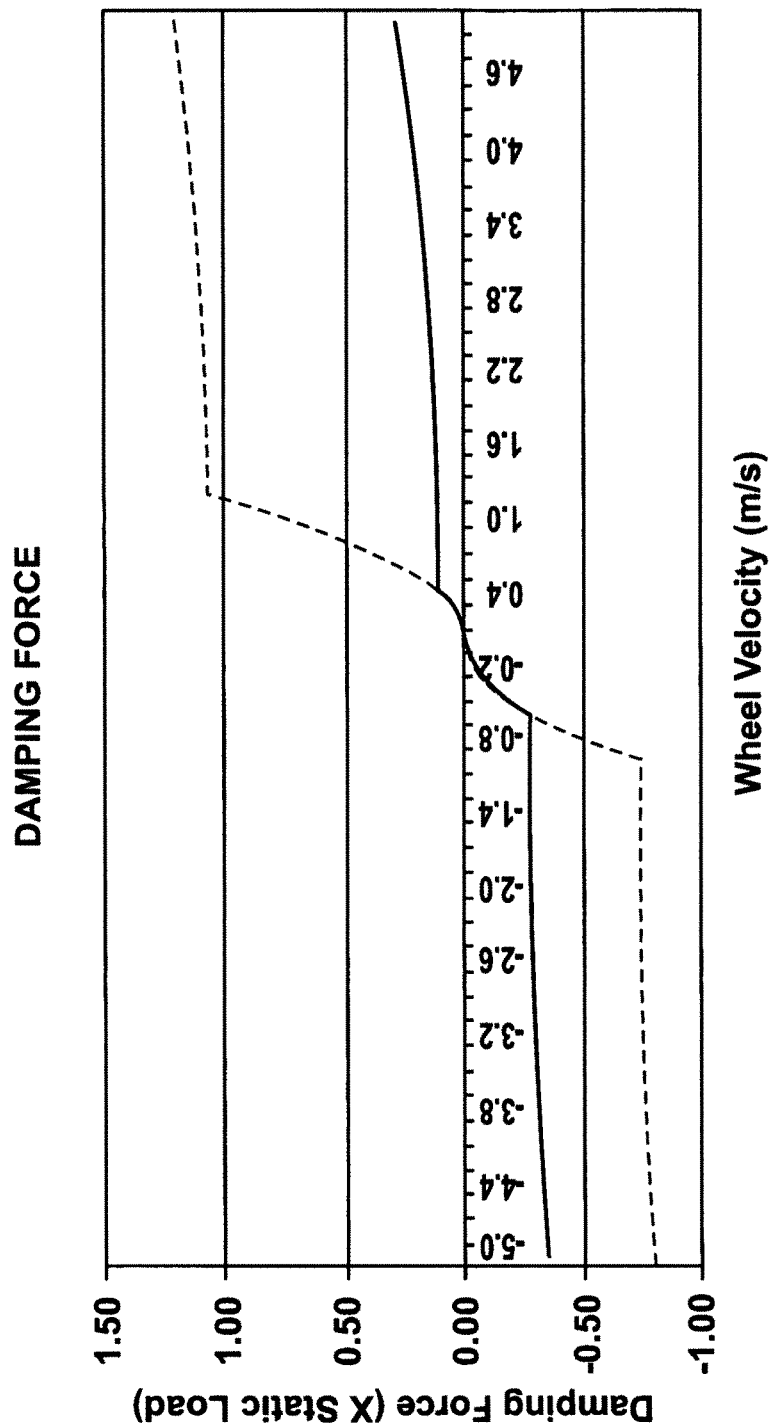

As stated above, the position of the upper orifice plate stop and the height of the spring spacer, ie the amount of 'float', set the bump and rebound 'cracking' forces independent to each other. Making these points adjustable shall allow the bump and rebound 'cracking' forces to be set independent to each other, as graphically illustrated in FIG. 20.

The adjustment can be achieved by numerous means such as, but not limited to:
i. Mechanical, ie screw thread, levels, ratchets, etc.
ii. Electro-Mechanical, ie motor driven lead screw, actuator, etc.
iii. Hydraulic, ie power take-off (PTO) pump, power steering linkage, etc.
iv. Pneumatic, ie auxiliary compressor, accumulators, valves and pipework, etc.

The position of the upper orifice plate stop and the spring spacer height could be adjusted such as not to pre-load the spring pack, thus providing minimum bump and rebound damping forces.

In addition to providing the ability to generate a near-linear and non-linear spring characteristics the new shock absorber can also be used to reduce or induce dynamic roll control during cornering (excluding motorbikes).

Figure 21:
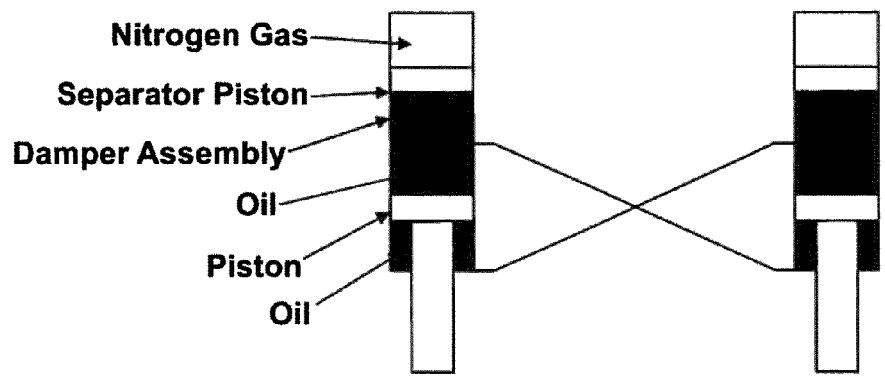
FIGS. 21 to 25 show various embodiments of cooperating shock absorbers.

Reduced roll control can be achieved by cross coupling the shock absorbers, as illustrated in FIG. 21.

Figure 22:
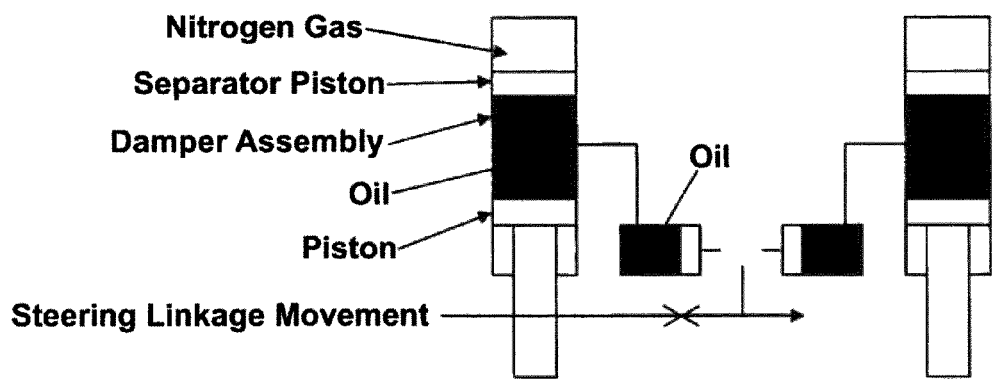
Figure 23:
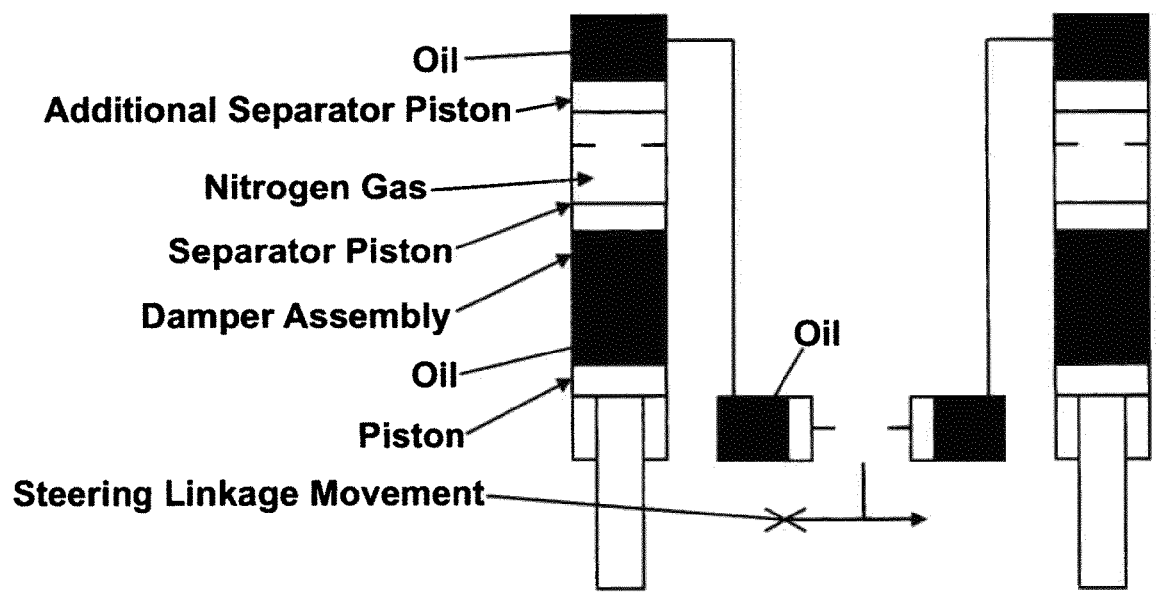
Figure 24:
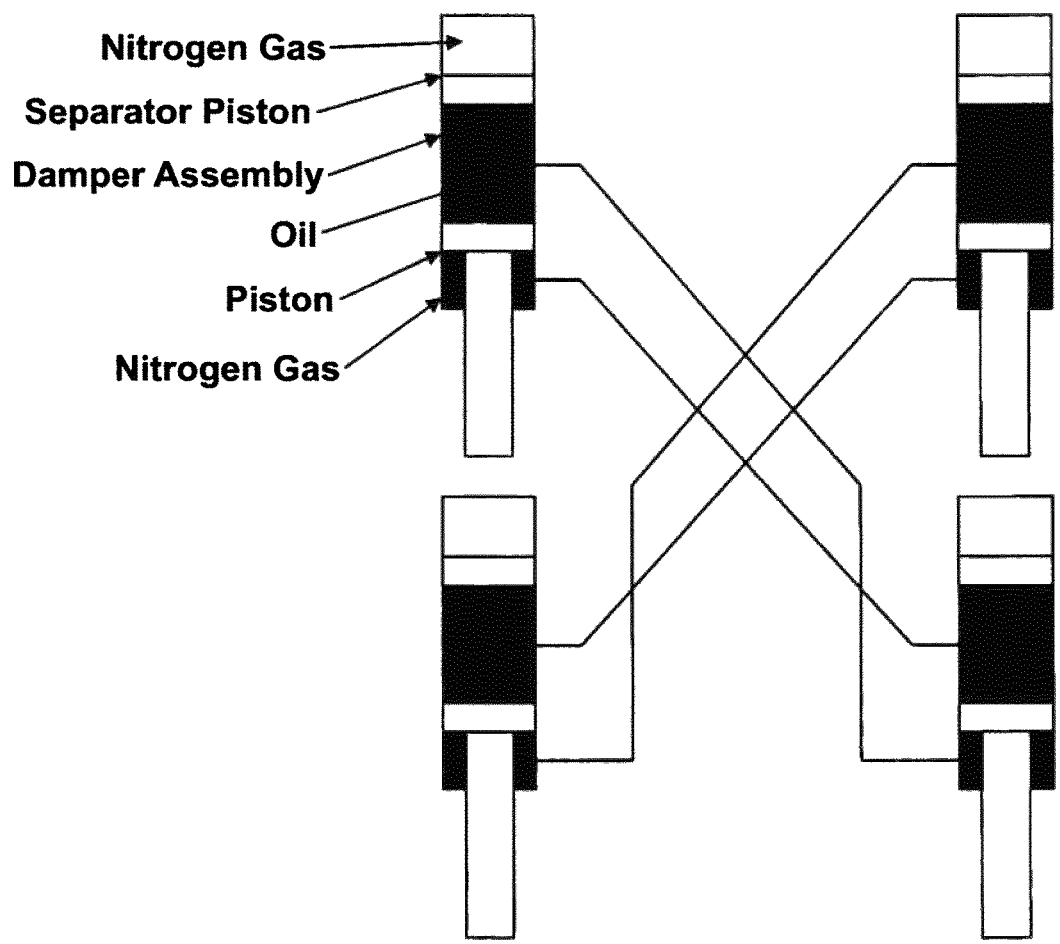

Induced roll control can be achieved by linking the volume of oil in each shock absorber to the vehicle's steering geometry. This can be achieved by, for example, connecting either an additional remote oil cylinder or two independent remote oil cylinders (either above or below the damper assembly) to the steering linkages and to each steering wheel's shock absorber, as illustrated in FIG. 22, for a standard shock absorber, and in FIG. 23, for an adjustable shock absorber.

As the steering linkage moves during cornering, it meters oil from each side of the cylinder's chambers into and out off the appropriate shock absorber. This metering alters the oil volume of each shock absorber, and thus changes its associated spring characteristics and ride height to induce body roll control resulting in improvements to the dynamic handling of the vehicle.

For example, a left-hand corner would increase the spring stiffness and ride height on the right steering wheel and reduce the spring stiffness and ride height on the left steering wheel or vice-versa for a right-hand corner or set equal for straight ahead.

The shock absorber assembly can also be used to induce safe vehicle handling dynamics while performing rapid vehicle manoeuvres. This comprises of dynamic pitch and roll control, which can be achieved by cross coupling the shock absorbers from corner to corner of the vehicle, ie from the oil chamber on top of the piston (either above or below the damper assembly) to the oil chamber on the under side of the piston (previously under vacuum or vented to atmosphere), as illustrated in FIG. 22. Such an arrangement in the suspension systems of large goods vehicles such as petrol tankers.

As with known types of shock absorber, when a wheel, say the front right, rises due to the vehicle performing a left-hand corner, it compresses the front right-hand shock absorber and forces the oil above the piston to pass through the damper assembly and compresses the nitrogen gas via the separator piston. The shock absorber continues to compress until equilibrium is reached between the vertical forces generated, ie by compressing the nitrogen gas and from the damper assembly against the vehicle cornering/braking. The front right of the vehicle lowers until this equilibrium is reached. The upward movement of the front right shock absorber's piston has two effects:
a) It increases the pressure of the oil above the piston, allowing oil to flow to below the piston of the rear left shock absorber, and
b) It creates the volume of the oil cylinder below the piston, allowing oil (under pressure) to flow from above the piston of the rear left shock absorber.

Both of these effects shall cause the piston of the rear left shock absorber to be displaced upwards resulting in lowering the rear left of the vehicle. This counteracts the lowering of the front right and alters the attitude and lowers the ride height of the vehicle, allowing it to traverse the corner faster.

Similarly, during straight-line braking, the forces generated shall cause the front shock absorbers to compress and the rear to rise, thus, stabilising the vehicle by reducing dive and lowering the centre-of-gravity.

Figure 25:
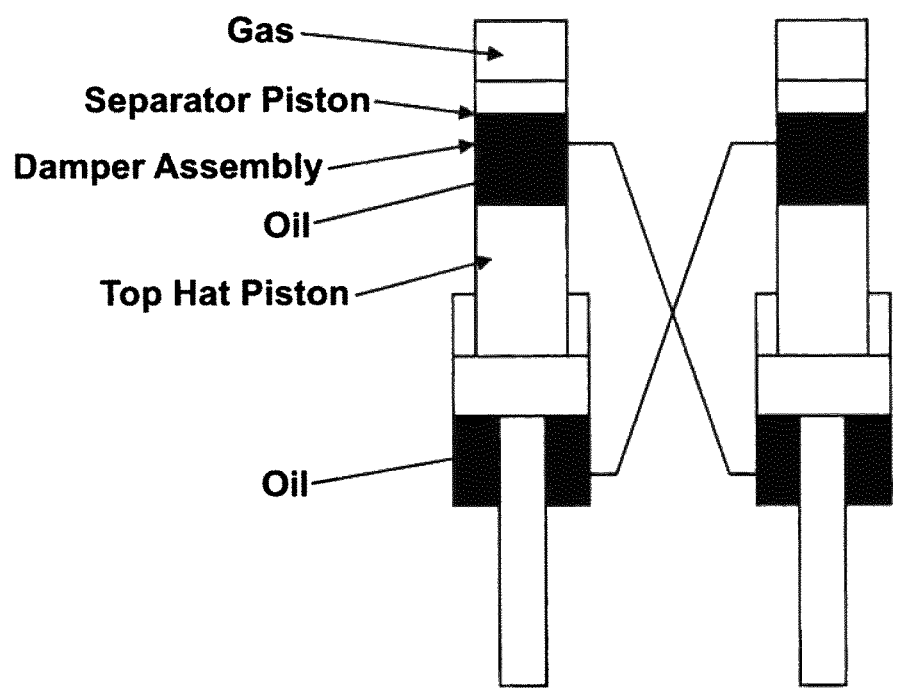

The amount of pitch and roll control is defined by the differences in area between above and below the shock absorber's piston. In general, using the same size bore above and below the piston shall result in the system being reactive, ie still have some form of pitch and roll. However, increasing the area below the piston to be larger than above shall result in the system being pro-active, ie the system being dynamic. This can be achieved by changing the piston to be a top hat type, as illustrated in FIG. 25.

The inventive shock absorber has been designed to replace either:
a) The vehicles existing coil spring and shock absorber assembly, or
b) The vehicles existing coil spring only (no damping valves), or
c) The vehicles existing shock absorbers (no coil spring).

The inventive shock absorber assembly can retain the existing adjustable parameters of:
i. Low flow rate bump shock absorber setting.
ii. Low flow rate rebound shock absorber settings.

In addition, the shock absorber assembly can have the following additional parameters:
i. Adjustable spring characteristic, from static to bump ratio of at least 1:3 to 1:9 and above.
ii. Adjustable high flow rate bump shock absorber setting.
iii. Adjustable high flow rate rebound shock absorber settings.
iv. Adjustable ride height, by say 35 mm for road/race or 100 mm for road/rally units.
v. Failsafe system reverts back to either Coil Spring or Nitrogen gas spring characteristic only, after major shock absorber failure.

Figure 26:
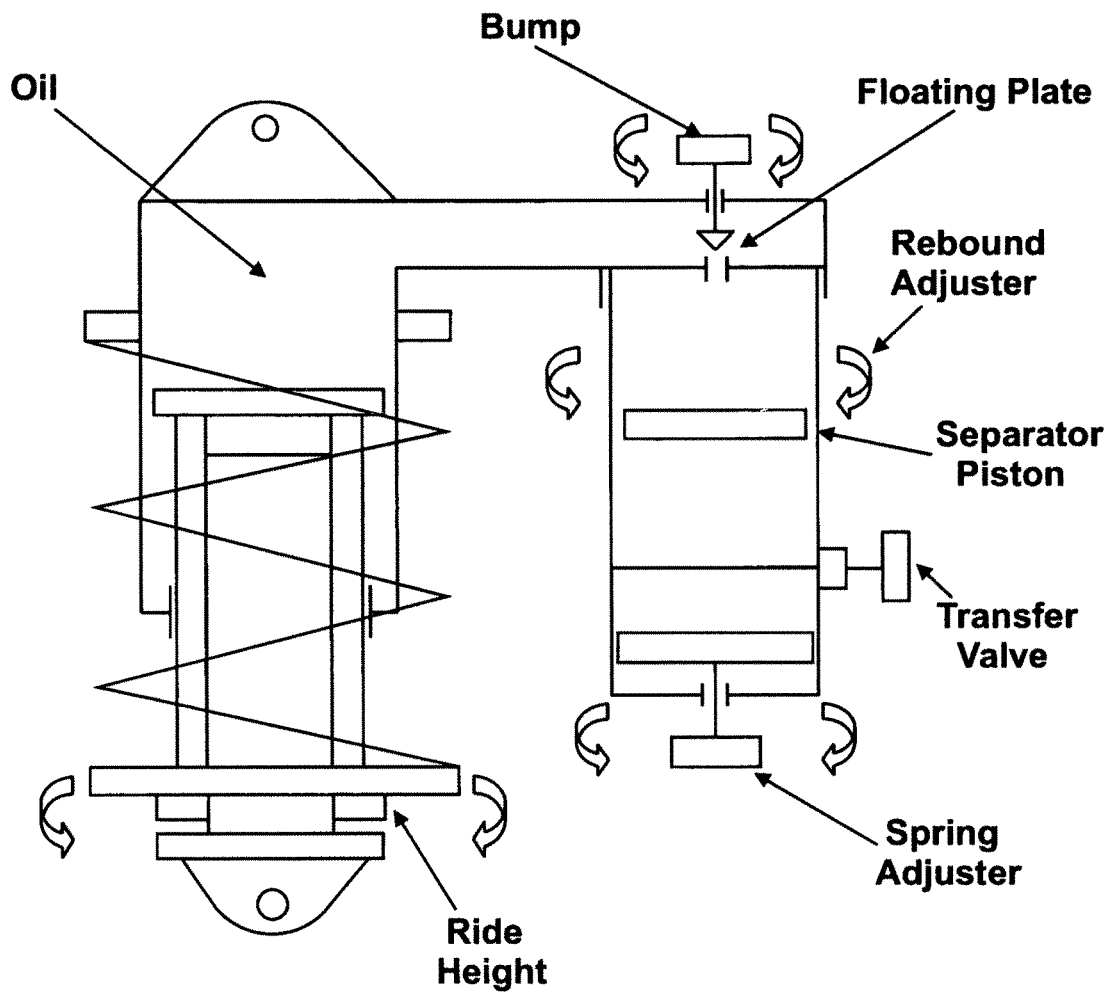
FIG. 26 shows schematically an embodiment of the inventive suspension system.
Figure 27:
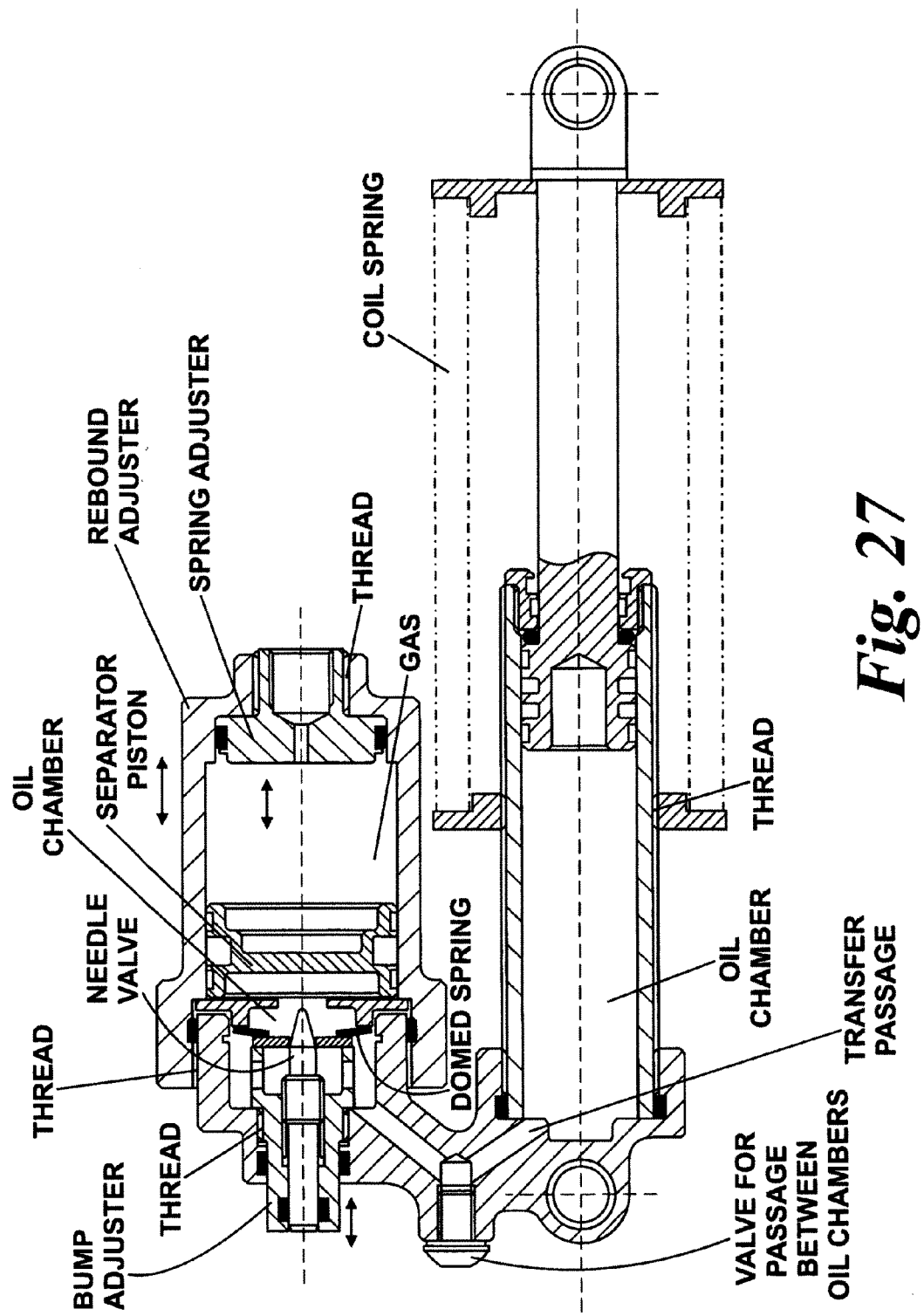
FIG. 27 is a detailed view of the inventive suspension system of FIG. 26.

A compact layout embodiment of the inventive suspension system is schematically illustrated in FIG. 26. A more detailed view is shown in FIG. 27.

Although the unit has adjustable bump and rebound damping, the two main features are:
a) Having a non-linear spring characteristic. This allows a softer ride around static, to absorb the small road undulations and bumps encountered on the straights, but becomes progressively stiffer as the suspension system is worked harder during cornering and braking. This system allows more power to be absorbed than the conventional over coil springs.
b) The ability to adjust this non-linear spring characteristic from 'road' to 'track' settings and vice versa. This enables the same vehicle to be driven to the track/circuit and then easily and quickly set-up for track use. The same system shall also incorporate the facility to fine-tune the suspension system to cater for the 'race' set-up differences needed from track to track.

For example the primary selling features for most motorbike riders would be the ability to adjust the rear suspension unit spring characteristic to account of:
a) The rider's individual weight.
b) The road condition, ie touring, road, street race, track, circuit etc.
c) The rider with a pillion and/or some luggage.

The inventive suspension system for cars can also be adapted to have the optional features of anti-pitch and roll control for cars, and pitch control for bikes. These are simple, non electrical non electronic devices, and provide a good degree of anti-pitch/roll control during accelerating, braking and cornering whilst maintaining a softer than normal spring characteristic (at nominal ride height). Thus, allowing the greater attitude control during rapid vehicle manoeuvres.

A crude, but effective form of dynamic roll control can also be incorporated into the unit for cars, to provide positive roll during cornering, ie the vehicle leans into the corner.

It will be appreciated that although mention has been made to motorised vehicles such as cars and motorbikes, the present invention also finds application in relation to suspension systems for other types of vehicle, such as bicycles.

In a modified version of the general embodiment show in FIGS. 26 and 27, an adjustable ball-valve assembly is provided in the transfer passage (see FIG. 27) to allow fluid to flow easily in one direction but in the opposite direction the fluid must be of a required pressure in order to overcome a resiliently biased stop-piece (eg a ball) and so pass through the valve. The required opening force in the opposite direction can be varied by adjusting the compression of a resilient member (eg a spring) (not shown) so, one can envisage with this modified embodiment that the domed spring controls bump force. In yet a further embodiment a domed spring arrangement is provided for control of each of the rebound force and the bump force respectively.

Figure 29:
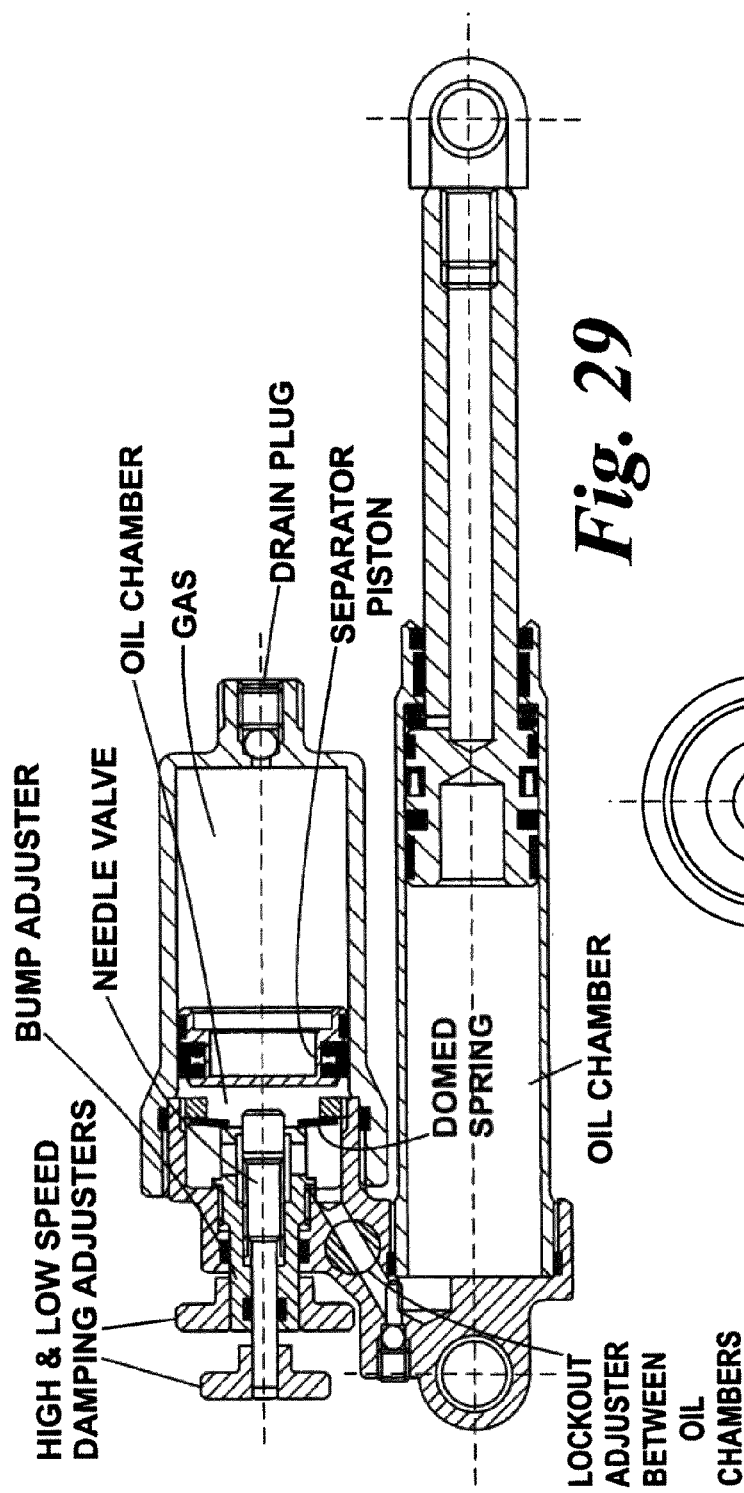
FIGS. 28 and 29 show another embodiment of the inventive suspension system.
Figure 28:
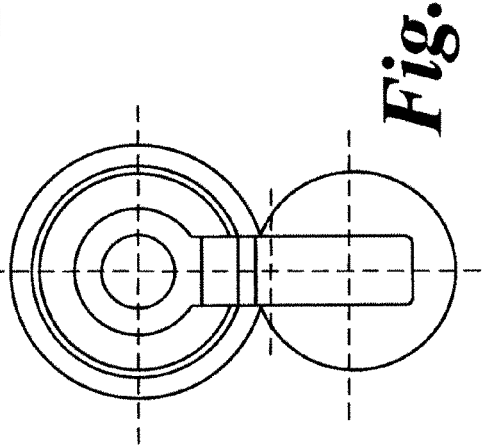

In a modified assembly, with reference to FIGS. 28 and 29, knurled rotatable adjusters are provided at the top of the piggy back gas chamber housing to allow separate adjustment of high and low speed damping.

A lock out feature is also provided comprising means to restrict or prevent oil flow through the transfer passage. The lock out adjuster could comprise a manual adjuster, or could comprise an electrical, pneumatic or hydraulic adjuster.

Figure 30:
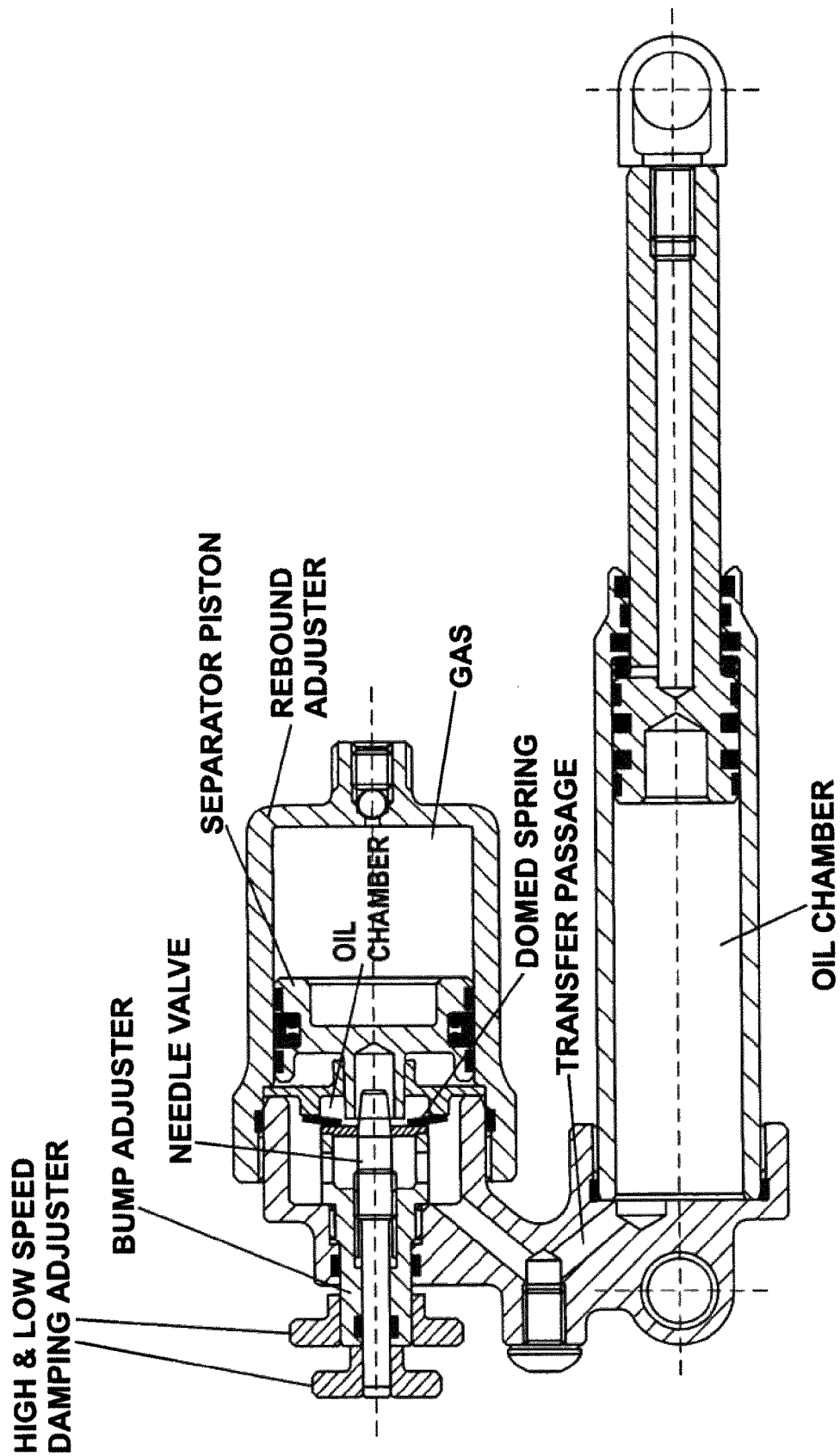
FIGS. 30 and 31 show additional embodiments of the inventive suspension system.

In the further modified assembly of FIG. 30, the lock out feature is not shown.

Figure 31:
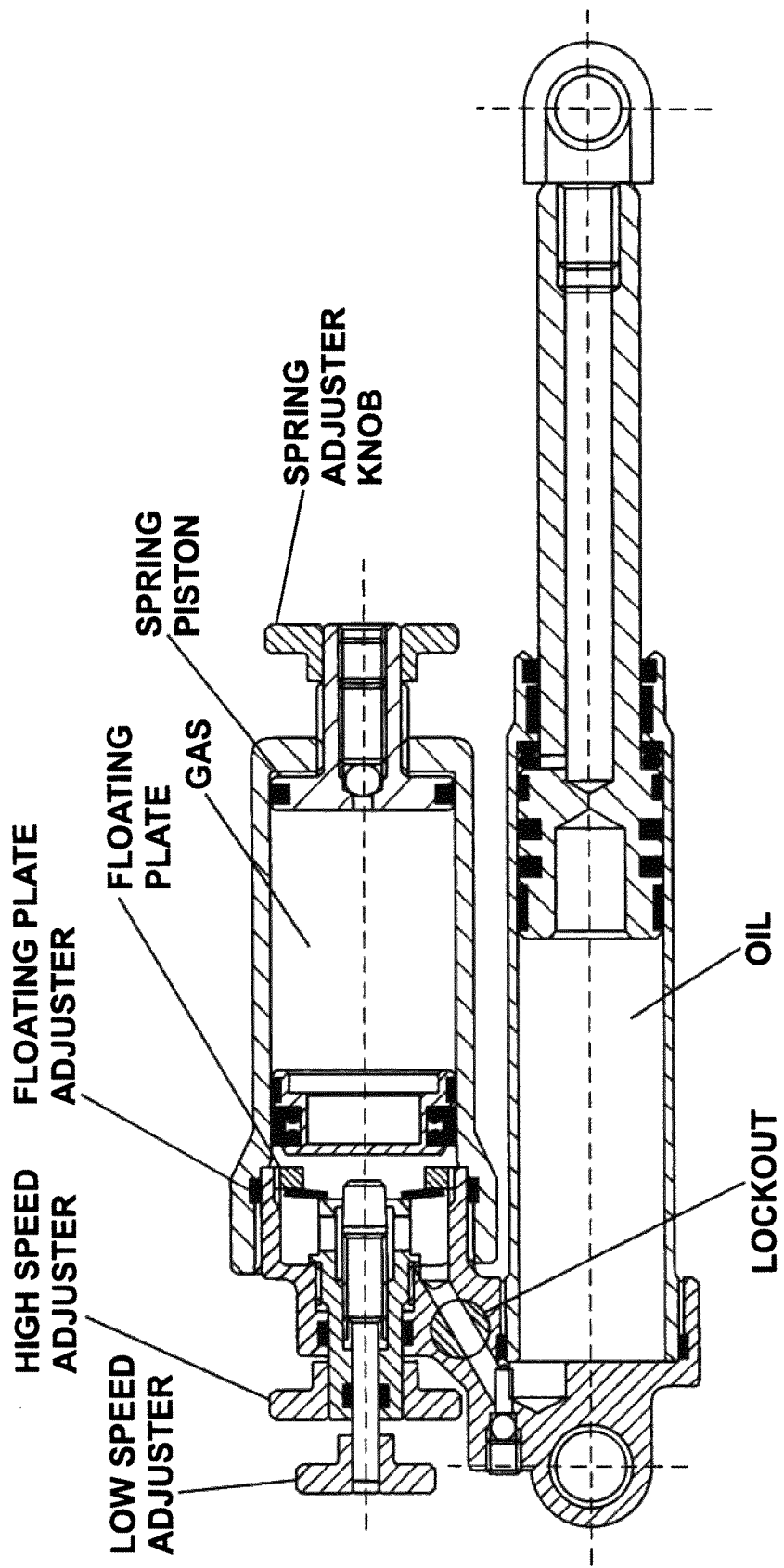

In the yet further modified assembly of FIG. 31, a spring adjuster knob is provided at the base of the piggy back gas chamber to adjust the position of the spring piston within the gas chamber.

The spring piston may additionally be provided with a small hole through the spring piston, and/or an additional seal between the gas cylinder and the thread of the spring piston.

What is claimed is:

1. A suspension assembly comprising:
   a shock absorber assembly including
      a piston slidable in a cylinder, the piston being sealingly arranged in the cylinder such that substantially no fluid can pass from a first side of the piston to a second side of the piston, and
      a coil spring arranged between the piston and the cylinder, the coil spring being configured to dampen relative movement between the piston and the cylinder;
   a damping-fluid chamber in fluid communication with said first side of the piston and configured to provide additional damping force to the shock absorber assembly;
   a damping valve arrangement located in the damping fluid chamber, said damping valve arrangement serving to divide the damping fluid chamber into subchambers, the valve arrangement regulating the flow of damping fluid between the subchambers of the damping-fluid chamber; and
   a first gas chamber separated from the damping-fluid chamber by a separator piston, the separator piston being arranged to separate the first gas chamber from the damping fluid chamber such that substantially no damping fluid can pass through the separator piston, the first gas chamber having a supporting spring characteristic, which is adjustable to a required setting by way of adjustment of a position of a movable piston to cause at least one of adjustment of the volume of the first gas chamber and adjustment of the proportion of the gas present in the assembly which is contained in the first gas chamber, and wherein the suspension assembly comprises an additional gas chamber provided in the cylinder, and the additional gas chamber separated from the first gas chamber by at least one of a bypass orifice and a transfer valve to allow transfer of gas in the additional chamber to enter into the first gas chamber.

2. A suspension assembly as claimed in claim 1, wherein the valve arrangement is adjustable to set a fluid pressure required to open the valve arrangement to allow flow of damping fluid through the valve arrangement.

3. A suspension assembly as claimed in claim 2, wherein the valve arrangement is adapted to allow the valve opening pressure for fluid flow in a first direction through the valve arrangement independently of the valve opening pressure in a second direction through said valve arrangement.

4. A suspension assembly as claimed in claim 2, wherein the valve arrangement comprises:
   a resiliently deflectable valve member, and
   a sealing surface portion against which an end portion of the valve member is capable of sealing, the valve arrangement being adjustable such that relative movement between the valve member end portion and the sealing portion is possible.

5. A suspension assembly as claimed in claim 4, further comprising a sealing surface portion against which an opposite end portion of the valve member is capable of sealing, the valve arrangement being capable of adjustable relative movement between said opposite end portion and the further sealing surface portion.

6. A suspension assembly as claimed in claim 4, wherein the resiliently deflectable valve member is arranged to allow damping fluid to act directly on said resiliently deflectable valve member.

7. A suspension assembly as claimed in claim 4, wherein the damping valve arrangement comprises an orifice plate which is provided with an orifice, the orifice being arranged to allow damping fluid to pass from one damping fluid sub-chamber to the other sub-chamber.

8. A suspension assembly as claimed in claim 7, the damping valve arrangement being arranged to allow adjustment of the size of the orifice.

9. A suspension assembly as claimed in claim 1, wherein the damping valve arrangement is adjustable to produce either a near-linear or nonlinear damping force characteristic.

10. A suspension assembly as claimed in claim 1, wherein the gas in the gas chamber has a non-linear spring-characteristic when compressed.

11. A suspension assembly as claimed in claim 1, wherein a spring characteristic of the suspension assembly is arranged to be adjustable from a near-linear spring characteristic to a non-linear spring characteristic, and vice versa.

12. A suspension assembly as claimed in claim 1, further comprising the moveable piston being moveable to adjust the volume of the gas chamber.

13. A suspension assembly as claimed in claim 1, wherein the piston which separates the gas chamber from the damping fluid chamber comprises a floating divider.

14. A suspension assembly as claimed in claim 1, further comprising the coil spring in series with the gas chamber.

15. A suspension assembly as claimed in claim 1 in which the damping valve arrangement comprises an adjustable ball-valve mechanism.

16. A suspension assembly as claimed in claim 1, wherein a position of the separator piston remains substantially constant during said adjustment of the position of the movable piston.

* * * * *